US006905614B1

(12) United States Patent
Novotny

(10) Patent No.: US 6,905,614 B1
(45) Date of Patent: Jun. 14, 2005

(54) PATTERN-TRANSFER PROCESS FOR FORMING MICRO-ELECTRO-MECHANICAL STRUCTURES

(75) Inventor: Vlad J. Novotny, Los Gatos, CA (US)

(73) Assignee: Active Optical Networks, Inc., Fremont, CA (US)

( * ) Notice: Subject to any disclaimer, the term of this patent is extended or adjusted under 35 U.S.C. 154(b) by 264 days.

(21) Appl. No.: 10/028,657

(22) Filed: Dec. 21, 2001

Related U.S. Application Data

(60) Division of application No. 10/032,198, filed on Dec. 20, 2001, which is a continuation-in-part of application No. 09/865,981, filed on May 24, 2001, now Pat. No. 6,483,962.
(60) Provisional application No. 60/206,744, filed on May 24, 2000, and provisional application No. 60/241,269, filed on Oct. 17, 2000.

(51) Int. Cl.[7] .............................................. H01L 21/00
(52) U.S. Cl. .............................. 216/2; 216/24; 216/41; 216/79; 385/16
(58) Field of Search .............................. 216/2, 24, 41, 216/79; 385/16

(56) References Cited

U.S. PATENT DOCUMENTS

| | | | | |
|---|---|---|---|---|
| 4,957,592 A | * | 9/1990 | O'Neill ........................... | 216/2 |
| 4,987,781 A | | 1/1991 | Reimann .................. | 73/517 R |
| 5,462,839 A | | 10/1995 | de Rooij et al. ............ | 430/320 |
| 5,569,355 A | | 10/1996 | Then et al. .............. | 156/643.1 |
| 5,724,123 A | | 3/1998 | Tanaka ....................... | 356/5.01 |
| 5,783,340 A | | 7/1998 | Farino et al. .................. | 430/22 |
| 5,872,880 A | | 2/1999 | Maynard ...................... | 385/88 |
| 5,959,516 A | * | 9/1999 | Chang et al. ................. | 334/14 |
| 5,994,160 A | | 11/1999 | Niedermann et al. ......... | 438/53 |
| 6,028,689 A | | 2/2000 | Michalicek et al. ........ | 359/224 |
| 6,097,859 A | | 8/2000 | Solgaard et al. .............. | 385/17 |
| 6,252,466 B1 | | 6/2001 | Kawamura .................... | 331/25 |
| 6,253,001 B1 | | 6/2001 | Hoen .......................... | 385/17 |
| 6,283,601 B1 | | 9/2001 | Hagelin et al. ............. | 359/871 |
| 6,301,403 B1 | | 10/2001 | Heanue et al. ................ | 385/18 |
| 6,320,993 B1 | | 11/2001 | Laor ........................... | 385/16 |
| 2002/0005976 A1 | * | 1/2002 | Behin et al. ................ | 359/254 |

OTHER PUBLICATIONS

"Routing Packets with Light," Daniel J. Blumenthal. Scientific American, pp. 96–99. Jan. 2001.
"Construction and performance of a 576×576 single–stage OXC," Herzel Laor. LEOS, San Francisco, California, 3 pages. Nov. 8, 1999.
"Application of micro– and nanotechnologies for the fabrication of optical devices," Wolfgang Ehrfeld and Hans–Dieter Bauer. SPIE vol. 3276, p. 2 and pp. 4–14.
"Performance of a 576×576 Optical Cross Connect," Laor, et al. NFOEC, Chicago, Illinois, pp. 1–5. Sep. 26, 1999.
"Control and shape design of an electrically–damped comb drive for digital switches," Yijian Chen. Proceedings of SPIE vol. 4178, 2000, pp. 387–394.
"The Rise of Optical Switching," David J. Bishop et al. Scientific American, pp. 88–94. Jan. 2001.

(Continued)

*Primary Examiner*—Shamim Ahmed
(74) *Attorney, Agent, or Firm*—Silicon Edge Law Group LLP; Arthur J. Behiel

(57) ABSTRACT

Described is a photolithography "pattern transfer" process for forming Micro-Electro-Mechanical Systems (MEMS) structures. A first material layer is patterned so that raised portions of the layer define features of a MEMS structure to be formed. The resulting pattern is then "transferred" to the surface of a second material layer by etching the top surface of the first material layer, including the raised portions and the valleys defined between the raised portions, until the second layer is exposed between the raised portions.

18 Claims, 27 Drawing Sheets

OTHER PUBLICATIONS

"A Large–Deflection Electrostatic Actuator for Optical Switching Applications," John D. Grade, Hal Jerman and Thomas W. Kenny. Presented at Hilton Head, 2000. 4 pages.

"Flip Chip Challenges," Steve Bezuk, PH.D, General Manager, Applied Technology Development and Flip Chip Kyocera America, Inc. First published in HDI Magazine, Feb. 2000. 6 pages.

"MEMS Feedback Control Using Through–Wafer Optical Device Monitoring," J.M. Dawson, et al. Proceedings of SPIE vol. 4178, 2000. pp. 221–227.

"A Flat High–Frequency Scanning Micromirror," Robert A. Conant, et al. 2000 Solid–State Sensor & Act Workshop, Hilton Head, S.C., Jun. 4–8, 2000.

"The Surface/Bulk Micromachining (SBM) Process: A New Method for Fabricating Released MEMS in Single Crystal Silicon," Sangwoo Lee, et al. Journal of Microeletromechanical Systems, vol. 8, No. 4, Dec. 1999. pp. 409–416.

"MEMS actuators for silicon micro–optical elements," Norman C. Tien and Daniel T. McCormick. Proceedings of SPIE vol. 4178, 2000. 256–267.

"Lightweight, Optically Flat Micromirrors for Fast Beam Steering," Jocelyn T. Nee, et al. Presented at IEEE/LEOS Optical MEMS 2000 Conference, Aug. 21–4, 2000, Kauai, Hawaii, USA. 2 pages.

"Optical MEMS for Optical Communications—Trends and Developments," Veljko Milanovic. Adriatic Research Institute. pp. 2–6. Downloaded Dec. 20, 2001.

Topical Review "The future of MEMS in telecommunications networks," James A. Walker. J. Micromech, Microeng.10 (2000) R1–R7. Printed in the UK.

"Silicon micromachines for lightwave networks: the little machines that will make it big," by David Bishop, Dec. 2000. SPIE's Optics & Information Systems. 8 pages.

D.J. Bishop Presentation, "Silicon Micromachines for Lightwave Networks: Can Little Machines Make it Big?" Lucent Technologies, Bell Labs Innovations. 83 pages. Feb. 1999.

"Multi–Layer, Self–Aligned Vertical Combdrive Electrostatic Actuators and Fabrication Methods." Behrang Behin and Satinderpall Pannu. Publication No.: US 2002/0005976 A1. publication Date: Jan. 17, 2002. Application No.: 09/810,333, filed Mar. 14, 2001.

* cited by examiner

PATTERN-TRANSFER PROCESS FOR FORMING MICRO-ELECTRO-MECHANICAL STRUCTURES

CROSS-REFERENCE TO RELATED APPLICATIONS

This application is a division of and claims priority under 35 U.S.C. §119(e) from U.S. patent application Ser. No. 10/032,198 entitled "Multi-Axis Micro-Electro-Mechanical Actuator," by Vlad J. Novotny and Yee-Chung Fu, filed on Dec. 20, 2001, which is a continuation-in-part of U.S. patent application Ser. No. 09/865,981 entitled "Optical Cross Connect Switching Array System With Optical Feedback," by Vlad J. Novotny, filed on May 24, 2001, now U.S. Pat. No. 6,483,962, which claims benefit of U.S. patent application Ser. No. 60/206,744, entitled "Optical Cross Connect Switching Array Systems With Optical Feedback Control," by Vlad J. Novotny, filed May 24, 2000, and Ser. No. 60/241,269, filed Oct. 17, 2000. This application additionally relates to U.S. patent application Ser. No. 10/027,882 entitled "Deep-Well Lithography Process For Forming Micro-Electro-Mechanical Structures," by Vlad J. Novotny, Dec. 21, 2001. Each of the above-identified documents is incorporated herein by reference.

BACKGROUND

As the result of continuous advances in technology, particularly in the area of networking, such as the Internet, there is an increasing demand for communications bandwidth. For example, the transmission of images or video over the Internet, the transfer of large amounts of data in transaction processing, or videoconferencing implemented over a public telephone network typically require the high speed transmission of large amounts of data. As applications such as these become more prevalent, the demand for communications bandwidth will only increase.

Optical fiber is a transmission medium that is well suited to meet this increasing demand. Optical fiber has an inherent bandwidth much greater than metal-based conductors, such as twisted-pair or coaxial cable; and protocols such as Synchronous Optical Networking (SONET) have been developed for the transmission of data over optical fibers.

Optical fiber is used to form optical networks that carry data, voice, and video using multiple wavelengths of light in parallel. Light is routed through the network from its originating location to its final destination. Since optical networks do not generally have a single continuous optical fiber path from every source to every destination, the light is switched as it travels through the optical network. Previously, this switching was accomplished using optical-electrical-optical ("OEO") systems, where a light signal was converted to an electrical signal, switched electrically, and then output optically. Because in OEO systems the signal must be converted from optical to electrical, switched, then converted back to optical, OEO systems are relatively large, complex, and expensive. More seriously, the OEO systems are slower than purely optical systems, and consequently introduce undesirable bottlenecks.

Much effort is being expended on the development of all-optical cross-connect switching systems, some of which employ arrays of electrostatically, electromagnetically, piezoelectrically, or thermally actuated mirrors. Digitally controlled mirrors with on and off states can be used to switch between small numbers of ports while analog controlled mirrors can be implemented with a small or a large number of ports. Analog controlled mirrors require bi-axial actuation; unfortunately, most electrostatic actuators used to position these mirrors suffer from relatively low torque, and consequentially require relatively high supply voltages to produce sufficient motion. The lack of torque also renders electrostatic actuators very sensitive to vibrations. There is therefore a need for a bi-axial actuator that operates at lower voltages and is relatively insensitive to vibration.

SUMMARY

The invention is directed to Micro-Electro-Mechanical Systems (MEMS) actuators that employ electrostatic comb electrodes to position mirrors along multiple axes. In one embodiment, an actuator assembly includes an actuator support, typically a silicon wafer, supporting one or more fixed comb-shaped electrodes, each with a plurality of teeth. A frame flexibly connected to the actuator support includes complementary sets of movable comb electrodes, the teeth of which are arranged interdigitally with the teeth of the fixed combs. The frame can be tilted with respect to the actuator support along a first fulcrum axis by applying a potential difference between the fixed and movable combs.

Each actuator assembly also includes an actuated member flexibly connected to the frame. In the depicted embodiment, the actuated member is a mirror mount. In other embodiments, the actuated member may support e.g. a filter, a lens, a grating, or a prism.

The actuated member and the frame include electrically isolated, interdigitated, comb electrodes. The actuated member can be moved relative to the frame along a second fulcrum axis by applying a potential between the comb on the frame and the comb on the actuated member. The actuated member can also be moved translationally by applying a potential between interdigitated combs.

In one embodiment, the hinges are made using the same conductive layers as the combs. The process used to form the hinges may differ from the process used to form the combs. Such processes allow the stiffness of the hinges to be adjusted independently. For example, the hinges may be made thinner to reduce the amount of torque required to move the actuated member. In another embodiment, serpentine hinges are employed to provide still greater flexibility.

A number of novel process sequences can be employed to manufacture MEMS actuators in accordance with the invention. In one such process, referred to herein as a "wafer bonding" process, one device layer on a Silicon-On-Insulator (SOI) or Spin-On-Glass (SOG) wafer is patterned to include the combs, hinges, etc., of the MEMS actuator(s) being formed. This patterned layer is then oxide- or glass-bonded to an intrinsic anchor wafer. A via etching is then performed on the other side of the intrinsic anchor wafer to electrically connect the devices to the driving circuitry. The other side of the original SOI or SOG wafer is then ground, polished, patterned, and etched as another device layer. Up to four different thicknesses are defined in these lithographic processes.

In another process, referred to herein as a "pattern transfer" process, one device layer is patterned to include features similar to the combs, hinges, etc., of the MEMS actuators being formed. The resulting pattern is then "transferred" to the surface of a second material layer by etching the top surface of the first material layer—including the raised portions and the valleys defined between the raised portions—until the second layer is exposed between the raised portions.

A third process that can be used to form MEMS actuators in accordance with the invention, referred to herein as "deep-well lithography," differs from conventional lithography in that the surface being patterned is not the uppermost surface. The focal plane of the photolithography equipment is offset from the uppermost surface as appropriate to account for the depth of the well in which the pattern is to be formed.

Both the pattern-transfer process and deep-well lithography advantageously reduce the number of process steps required to produce MEMS actuators in accordance with the invention, and can additionally be used to form structures other than MEMS actuators.

This summary does not limit the invention, which is instead defined by the appended claims.

DETAILED DESCRIPTION

Figure 1A:
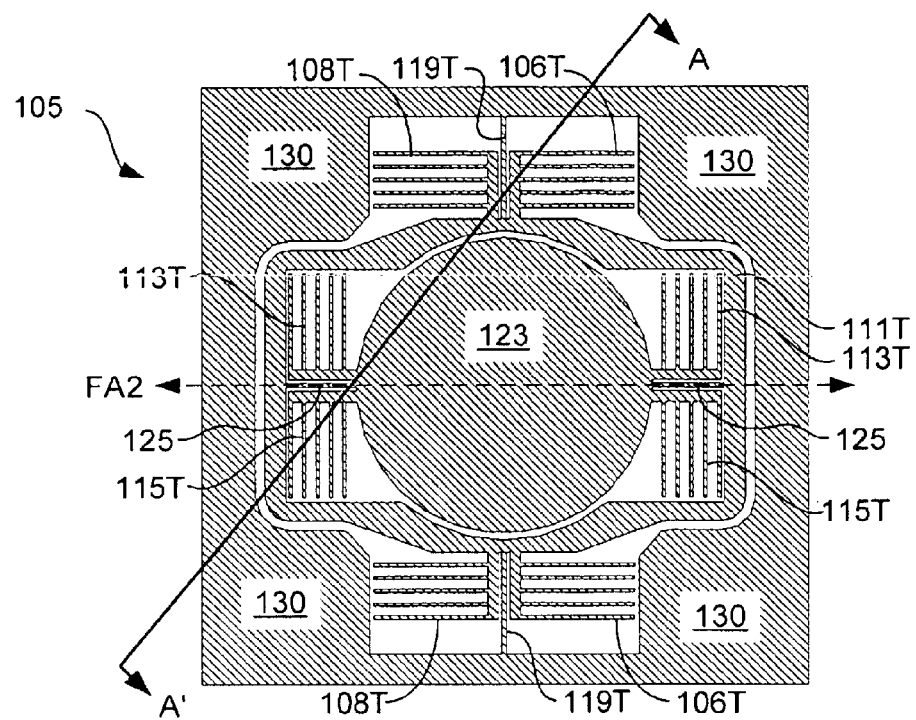
FIGS. 1A and 1B, respectively, are plan views of the upper and lower portions of a two-axis, Micro-Electro-Mechanical System (MEMS) actuator in accordance with one embodiment of the present invention.
Figure 1B:
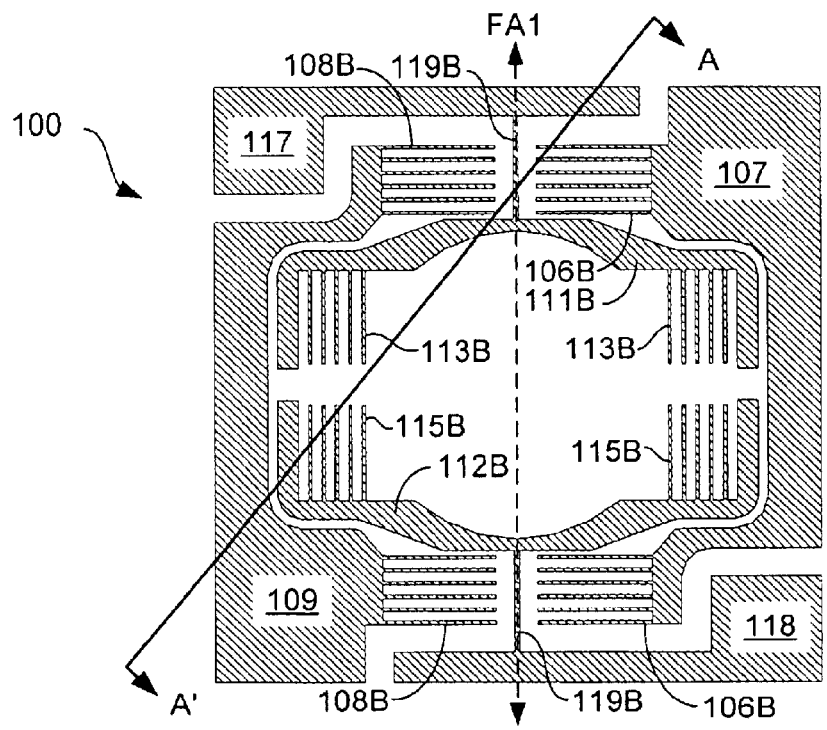

FIGS. 1A and 1B, respectively, are plan views of the top (T) and bottom (B) portions of a multi-axis, Micro-ElectroMechanical Systems (MEMS) actuator in accordance with one embodiment of the present invention. Bottom half 100 includes a pair of fixed combs 107 and 109 and a pair of electrodes 117 ard 118 attached firmly to the underlying substrate (not shown). Each of fixed combs 107 and 109 includes a respective plurality of teeth 106B and 108B that extend in the direction depicted as horizontal in FIGS. 1A and 1B. Fixed combs 107 and 109 are electrically isolated from one another so that disparate voltages can be applied thereto. The "B" in numerical designations 106B and 108B indicate that teeth 106B and 108B are associated with bottom half 100. The remainder of this application follows this convention.

Bottom half 100 includes frame portions 111B and 112B, which also function as frame combs. Frame portions 111B and 112B each support a plurality of frame teeth 113B and 115B, respectively, which extend in a direction perpendicular to the fixed teeth of combs 107 and 109. Frame portions 111B and 112B connect to respective electrodes 117 and 118 via a pair of hinge portions 119B. Frame portions 111B and 112B, including teeth 113B and 115B, are disposed above the underlying substrate so frame portions 111B and 112B can pivot along a fulcrum axis FA1 defined along hinges 119B.

Turning to FIG. 1A, top half 105 is bonded over bottom half 100 with an electrically insulating layer (detailed below) sandwiched in between. Top half 105 includes a frame 111T ("T" is for "top") bonded to frame portions 111B and 112B of FIG. 1B. Frame portion 111T includes a plurality of movable combs 106T and 108T, each including a plurality of comb teeth extending in the horizontal direction of FIGS. 1A and 1B. Movable comb teeth 106T and 108T are rigidly connected to frame portion 111T, and are arranged above fixed combs 106B and 108B such that the fixed and movable teeth are interdigitated from a perspective perpendicular to a plane defined by the horizontal and vertical axes depicted in FIGS. 1A and 1B (i.e., normal to the page).

Top half 105 includes an actuated member 123, in this case a mirror surface, connected to frame portion 111T via a pair of hinges 125. Hinges 125 allow member 123 to pivot along a second fulcrum access FA2 perpendicular to the fulcrum access FA1 defined by hinges 119B. Member 123 additionally includes a collection of combs 113T and 115T, each of which includes a plurality of teeth extending over and in parallel with respective teeth 113B and 115B of bottom half 100. The teeth in combs 113T (and 115T) and teeth 113B (and teeth 115B) are arranged interdigitally from a perspective perpendicular to a plane defined by the vertical and horizontal axes of FIGS. 1A and 1B.

The lower counterparts to hinge portions 119T, depicted in FIG. 1B as hinge portions 119B, electrically connect electrodes 117 and 118 to respective frame-portions 111B (and teeth 113B) and 112B (and teeth 115B) so that voltage may be applied to combs 113B and 111B via electrodes 117 and 118, respectively. Returning to FIG. 1A, hinge portions 119T and hinges 125 electrically connect combs 113T, 115T, frame portion 111T, and combs 106T and 108T to the surrounding silicon 130.

In one embodiment, member 123 is actuated in one direction along FA2 axis (say positive direction) by holding silicon 130 (i.e. teeth 106T, 108T, 113T and 115T) at ground potential and also teeth 115B, 106B and 108B at ground potential while adjusting the voltage levels applied to teeth 113B. Electrical leads that run along hinge portions 119B connect teeth 113B and 115B to the respective electrodes 117 and 118. To move member 123 in the negative direction, ground potential is kept again at all top teeth, i.e. 106T, 108T, 113T and 115T, and at 108B, 108B and 113B, while a desired voltage is applied to teeth 115B. To rotate frame 111T along FA1 axis in one direction, all top teeth and bottom teeth 113B, 115B, and 108B are at ground potential and teeth 106B have voltage applied to them; to rotate frame 111T along FA1 in the other direction, all top teeth and bottom teeth 113B, 115B, and 106B are at ground potential and teeth 108B have voltage applied to them. To rotate member 123 along both FA1 and FA2 axes, different voltages are applied to 106B and 113B (or 115B) or to 108B and 113B (or 115B) at the same time. Member 123 may also be moved in a direction normal to the fulcrum axes by applying a potential difference between the combs of top half 105 and bottom half 100. Member 123 may therefore be positioned in three dimensions.

Bottom frame portions 111B and 112B are bonded to top frame portion 111T during the process sequence described below. The resulting frame can be rotated along the axis FA1 defined by hinges 119B and 119T by applying a voltage difference between teeth 106B and ground or between teeth 108B and ground. Combs 106T and 108T are termed "movable" because they move relative to stationary combs 106B and 108B. Similarly, actuated member 123 can be rotated along axis FA2 by applying a voltage difference between the silicon 130 and either electrode 117 or electrode 118.

FIGS. 2 through 32 depict a process sequence in accordance with an embodiment of the invention. The process sequence can be employed to fabricate an actuator of the type depicted in FIGS. 1A and 1B. FIGS. 2 through 32 depict the device in cross section, with the resulting structure appearing similar to the device of FIGS. 1A and 1B cut along line A–A'.

Figure 2:
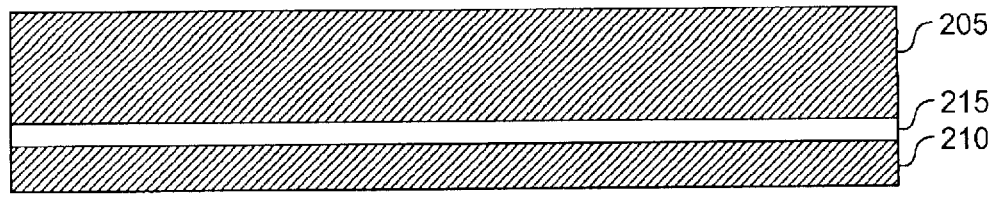
FIGS. 2 through 32 depict a wafer-bonding process sequence in accordance with an embodiment of the invention.
Figure 3:
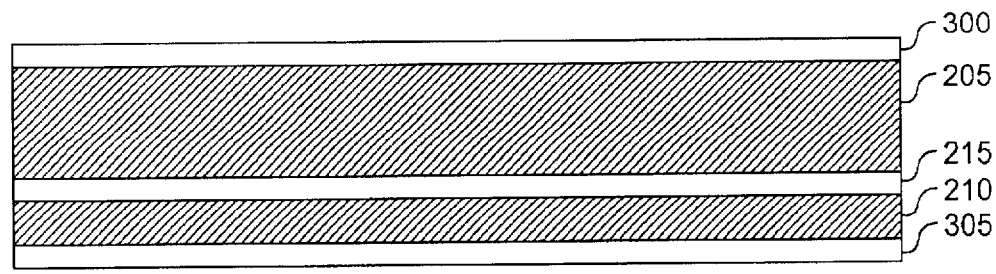
Figure 4:
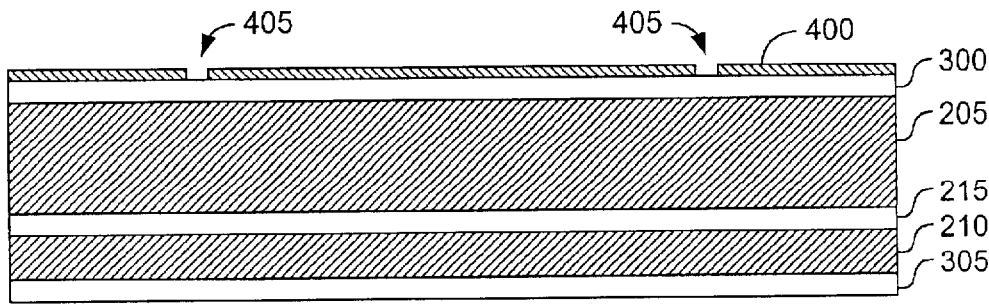
Figure 5:
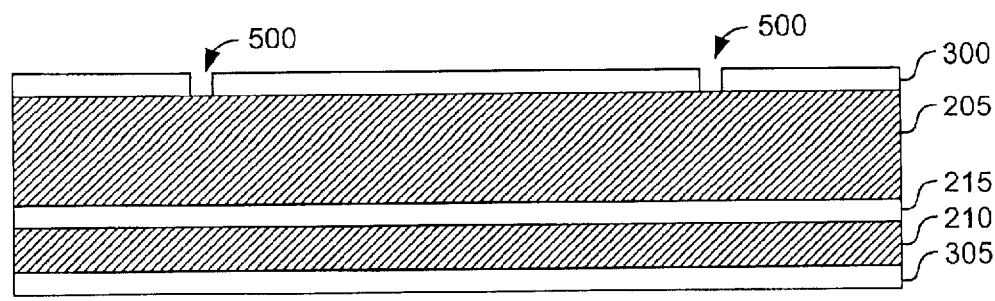
Figure 6:
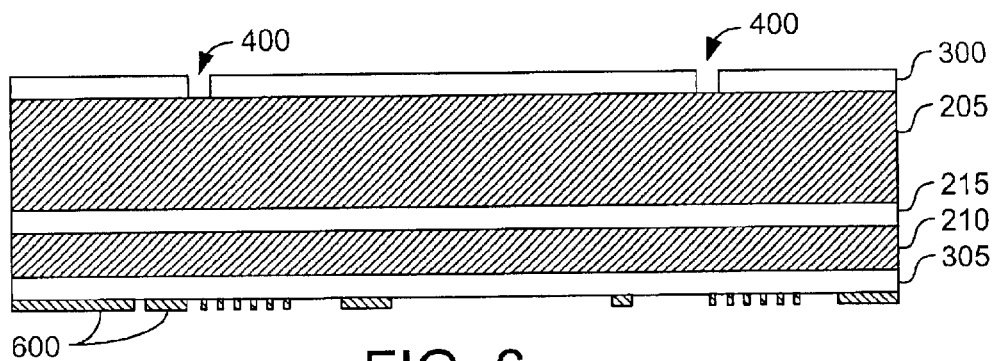
Figure 7:
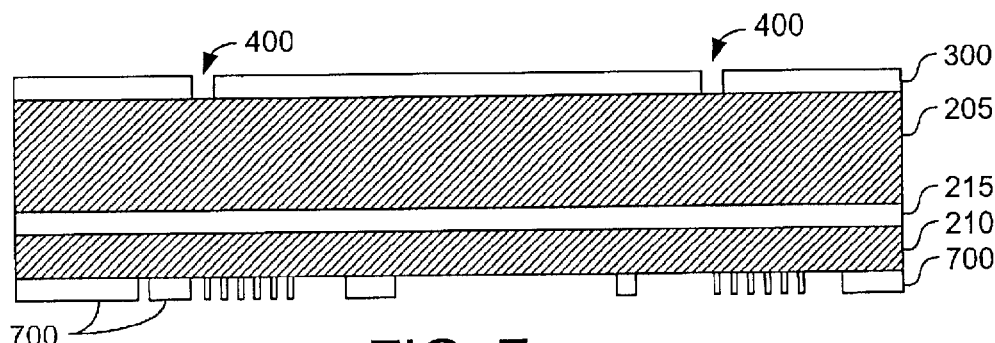

FIG. 2 depicts an SOI or SOG wafer 200 that includes a layer of handle silicon 205 connected to a 20–100 micron thick device silicon layer 210 via a 1–2 micron thick silicon dioxide or glass layer 215. As depicted in FIG. 3, the exposed surfaces of silicon layers 205 and 210 are coated with silicon dioxide mask layers 300 and 305. The resulting structure is then masked using a photoresist layer 400 (FIG. 4) to define a set of alignment marks 405. Alignment marks 500 are then etched in oxide layer 300 and the photoresist layer 400 is removed to produce the structure of FIG. 5. Silicon layers 205 and 210 are both doped, either n-type or p-type, and have a resistivity of about 5 to 100 ohms-cm in one embodiment.

Next, a layer of photoresist is patterned over oxide layer 305 to create a mask 600 used to define each element of bottom half 100 (FIG. 1B) except for hinge portions 119B. The exposed portions of oxide layer 305 are then subjected to a dry silicon-dioxide etch, leaving an oxide mask 700 of the pattern defined by mask 600. Mask 600 is then removed, leaving the structure of FIG. 7.

Figure 8:
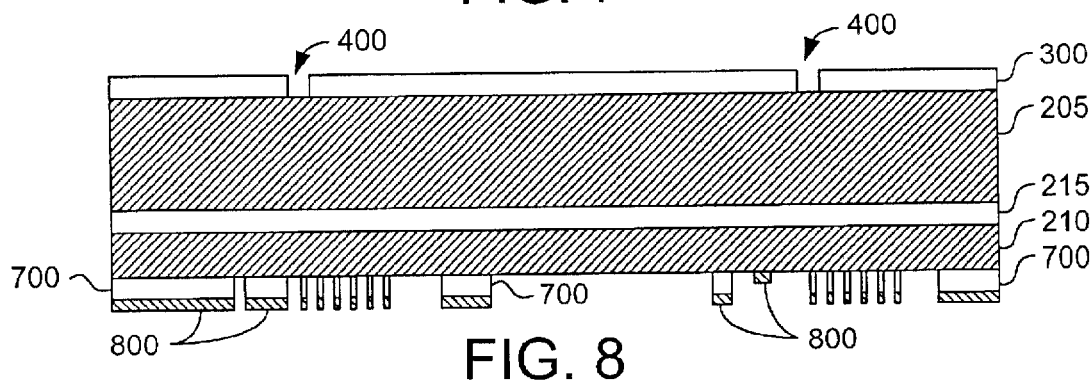
Figure 9:
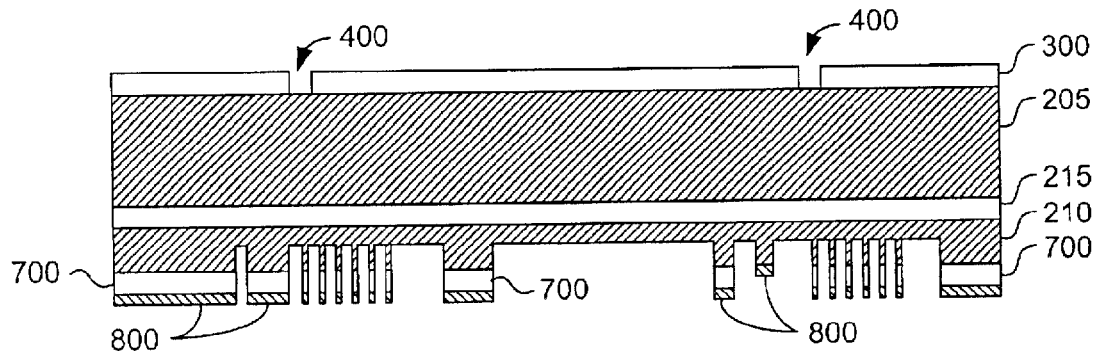
Figure 10:
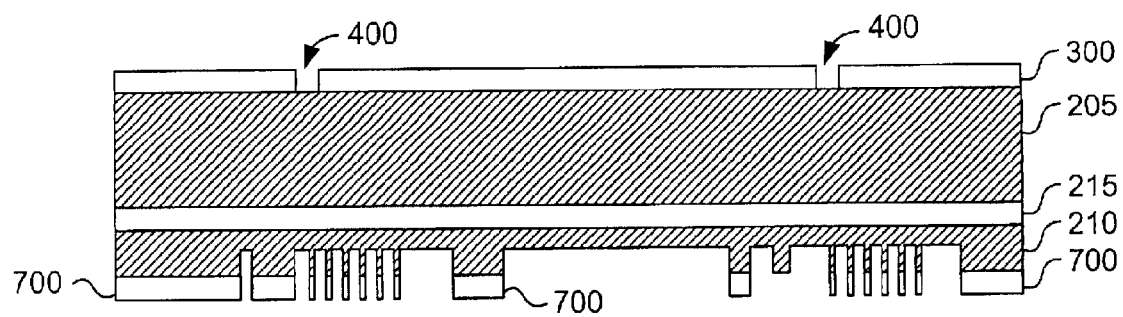

A photoresist layer 800 is patterned over oxide mask 700 and over those portions of device silicon 210 that are to become hinge portions 119B (FIG. 8). The resulting structure is then subjected to a silicon reactive-ion etch (RIE) to remove a desired depth of device layer 210 in the exposed regions (FIG. 9). The mask used in this etch step includes two sub-masks: oxide mask 700 and the pattern photoresist layer 800. The etch depth is related to the final thickness of hinge portions 119B. The photoresist mask 800 is then removed, exposing oxide mask 700 and the portions of device layer 210 that will become hinge portions 119B (FIG. 10).

Figure 11:
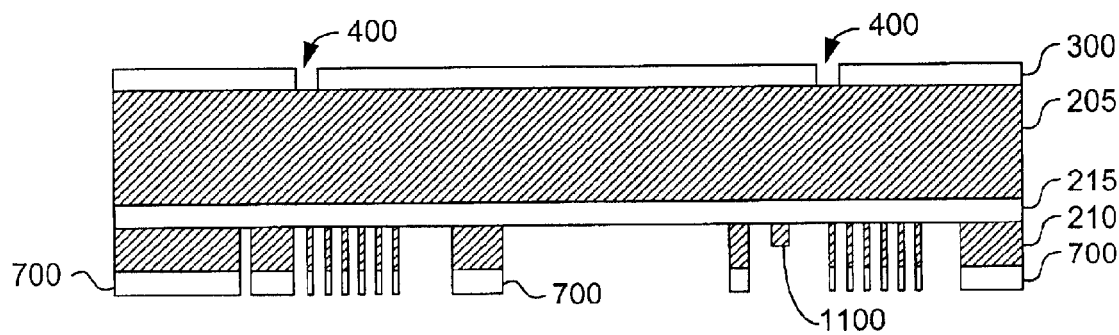

A second silicon RIE removes the remaining unmasked silicon of layer 210 down to oxide or glass layer 215, which acts as an etch-stop layer (FIG. 11). Portions 1100 of silicon layer 210 that will later become hinge portions 119B are left adhered to oxide layer 215 because, as shown in FIG. 10, portions 1100 entered the etch step thicker than the surrounding exposed portions of silicon layer 210. The hinges undergo this fabrication sequence to make them thinner, and consequently more flexible, than the surrounding device features. When it is desired to keep hinges of the same thickness as the teeth, the steps of FIGS. 8–10 are skipped.

In an optional step, a refractory coating 1200 is applied through a shadow mask to an exposed portion of oxide layer 215 to balance the stress imposed by a reflective layer applied opposite coating 1200 on layer 205 in a later step. The resulting structure is depicted in FIG. 12.

Figure 13:
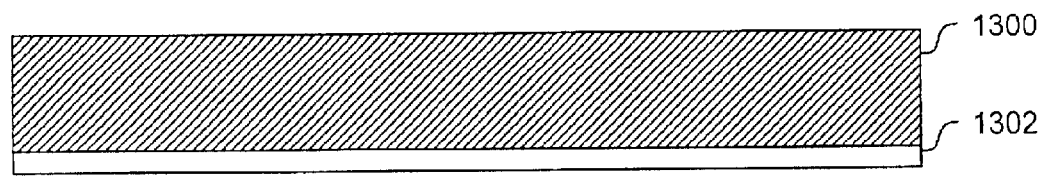
Figure 14:
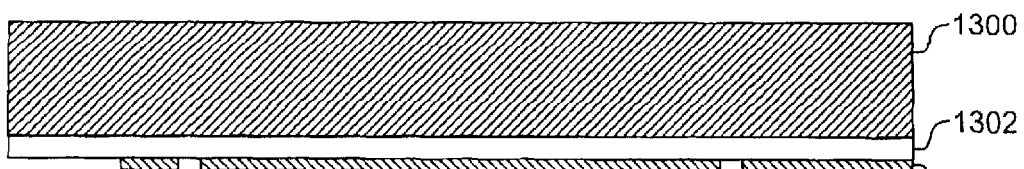
Figure 15:
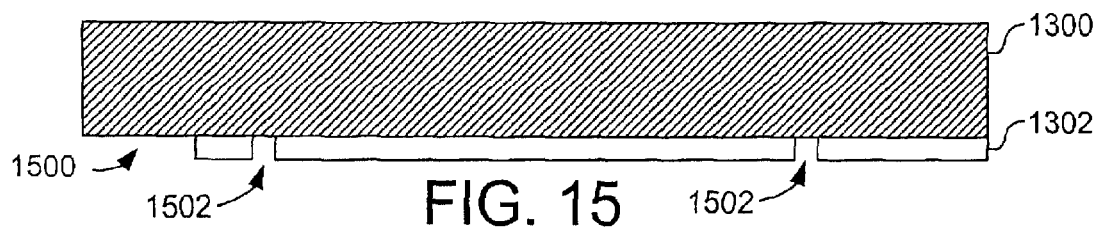

The process of fabricating the actuator support begins, as shown in FIG. 13, with an intrinsic silicon wafer 1300 coated with a layer of silicon dioxide (or glass) 1302. Layer 1302 is conventionally masked using a layer of photoresist 1400 to define electrical contacts to silicon layer 1300 and a plurality of alignment marks (FIG. 14). Layer 1302 is shown in FIG. 15 to include an area 1500 in which will be formed a via and a number of openings 1502.

Figure 16:
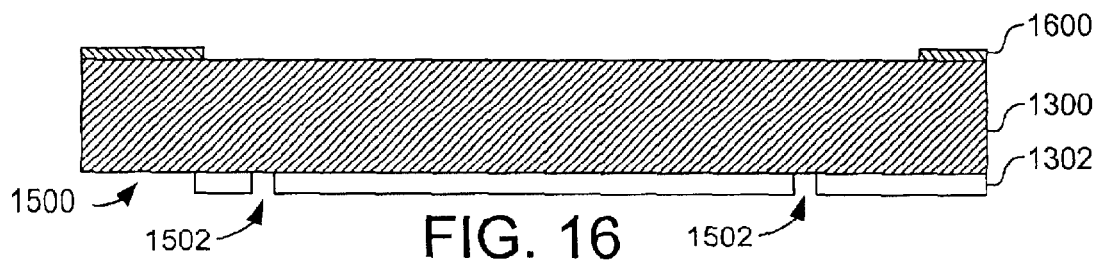
Figure 17:
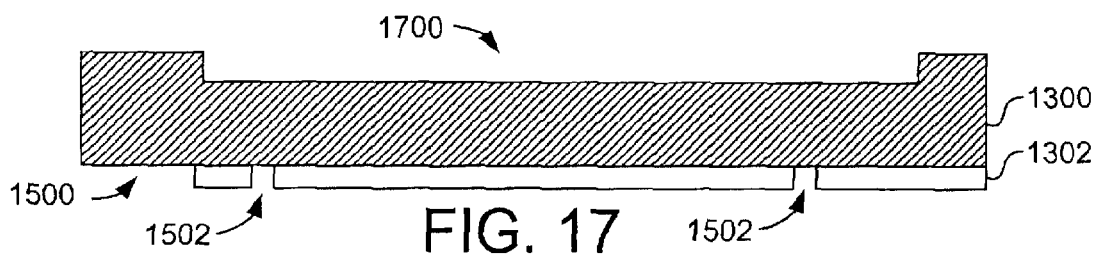

In FIGS. 16 and 17, a photoresist layer 1600 is patterned over silicon 1300 to define an area 1700 in which approximately 100 microns of silicon is etched away from silicon layer 1300 using RIE. The resulting structure, including area 1700 and alignment marks 1502, is depicted in FIG. 17.

Figure 12:
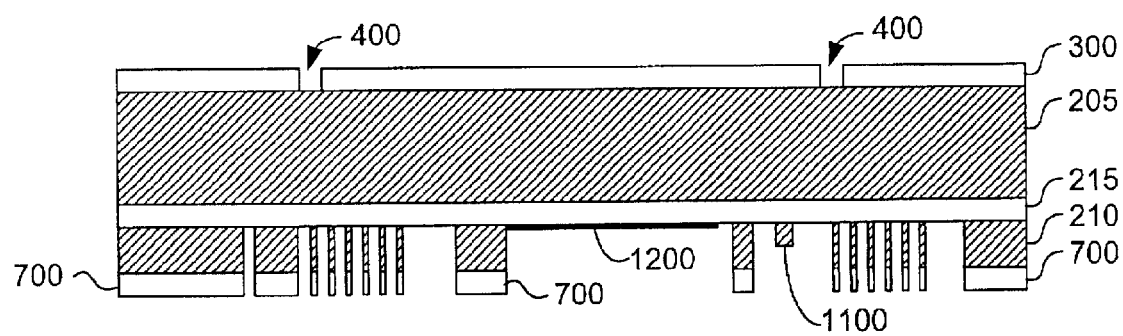
Figure 18:
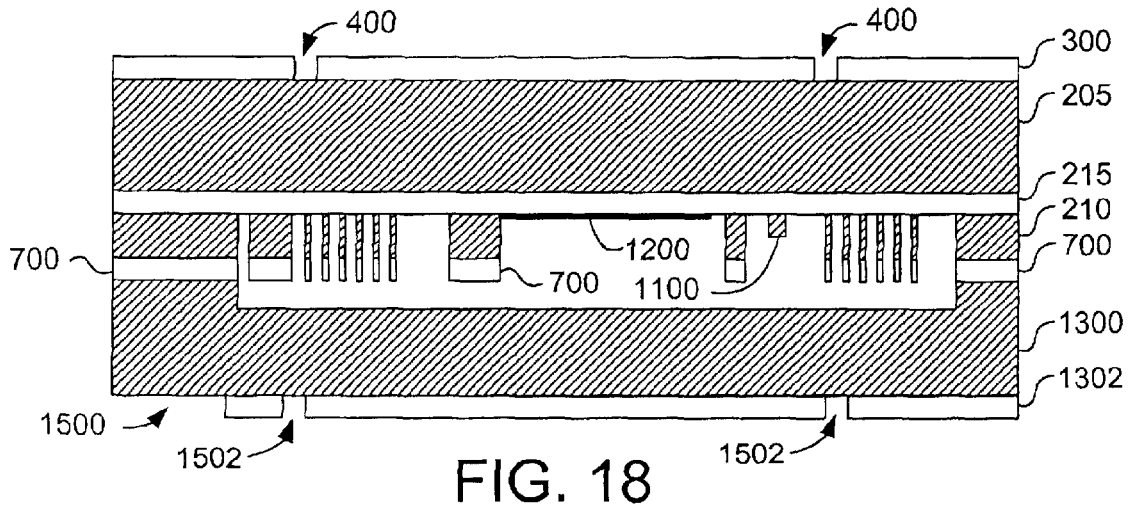

In the next step, the structure of FIG. 17 is brought into contact with the structure of FIG. 12, out of which will be formed bottom and top halves 100 and 105 (FIG. 18). The two portions are aligned using the respective alignment marks 400 and 1502 and then fused together using a heat treatment. In an embodiment in which mask 700 is silicon dioxide, the structure is heated to approximately 1,000 to 1,100 degrees Celsius. In an embodiment in which mask 700 is sol gel glass, the structure is heated to between 200 and 400 degrees Celsius. The lower process temperatures employed when glass is used for layers 215 and mask 700 minimize stresses associated with thermal expansion in the multi-layer structures.

Figure 19:
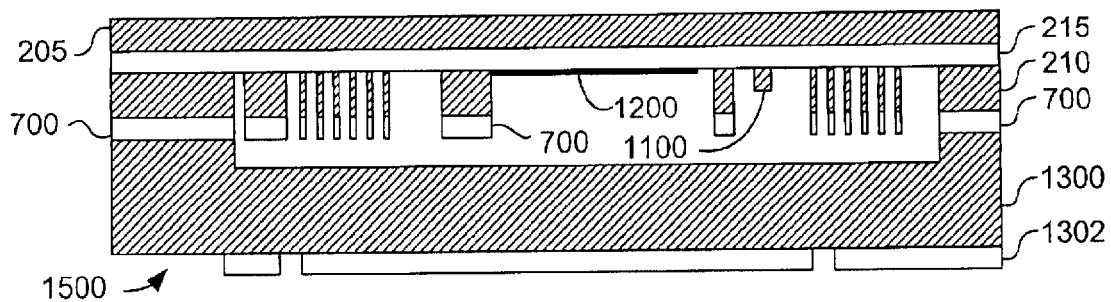
Figure 20:
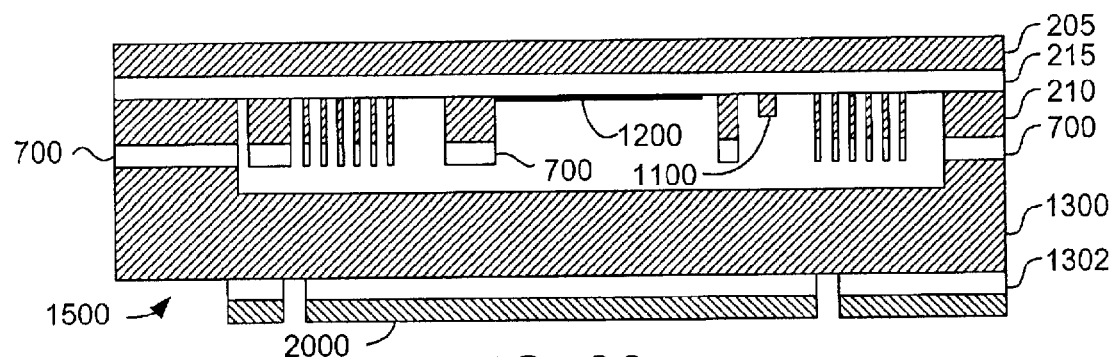
Figure 21:
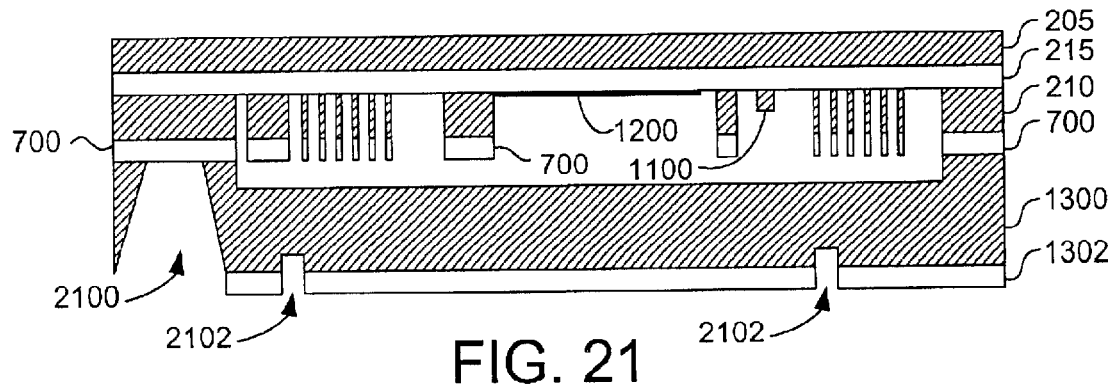
Figure 22:
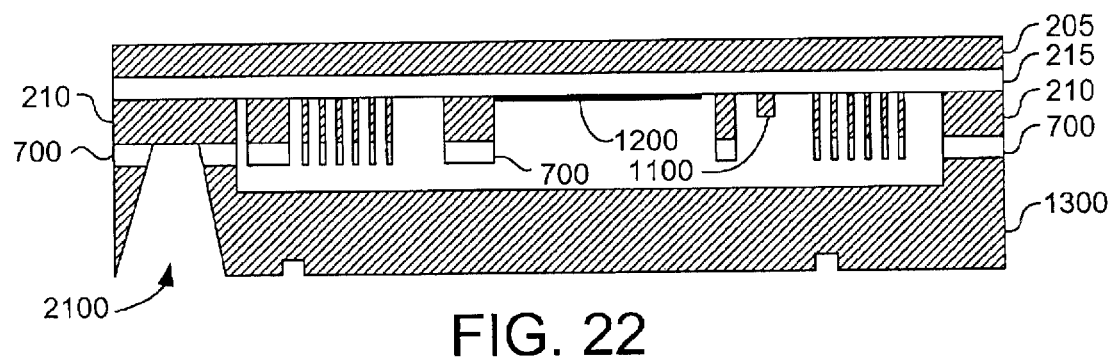

Referring now to FIG. 19, the top surface of silicon layer 205 is ground, lapped, and polished to a mirror finish. The resulting thinned silicon layer 205 is approximately 20 to 100 microns thick. Next (FIG. 20), a photoresist mask 2000 is applied to oxide layer 1302 using the same mask used to define the pattern of oxide layer 1302 in FIG. 14. A combined mask of photoresist (2000) and oxide (1302) is used for very deep silicon etching. A subsequent silicon RIE step removes some of layer 1300 in the vicinity 1500 to expose a portion of oxide mask 700, producing the structure of FIG. 21. The RIE used to form the structure of FIG. 21 is adjusted so that the sidewalls of opening 2100 are not normal to the surface. Alternatively, wet etching of silicon can be used to produce sloping wall vias. In this case, silicon nitride mask is preferable to silicon dioxide mask. This leaves alignment marks 2102 in layer 1300 but prevents those marks from extending far into layer 1300.

In the next step, oxide layer 1302 and the portion of oxide layer 700 exposed during the previous step are removed using an oxide dry-etch process. In the resulting structure, illustrated in FIG. 22, the underside of layer 210 is exposed to allow a subsequently formed via to make electrical contact to the portion of layer 210 that will become the body of comb 109 of FIG. 1A. Similar vias make contact to electrode 117, electrode 118, and comb 107, though these are not shown in this cross section.

Figure 23:
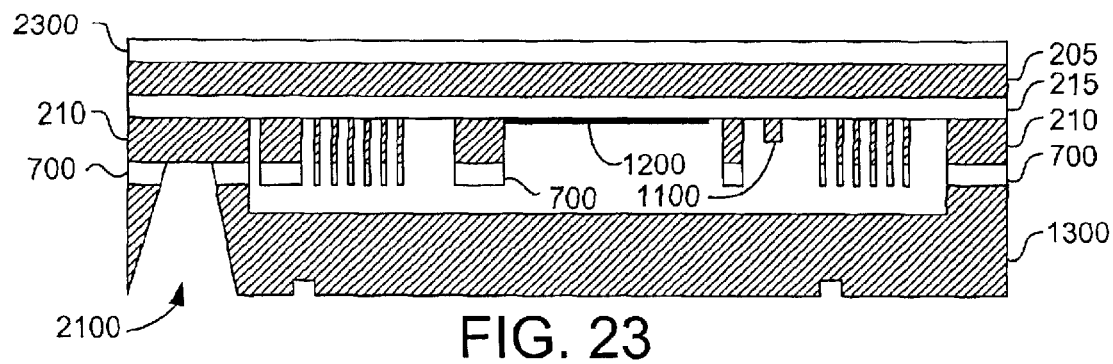
Figure 24:
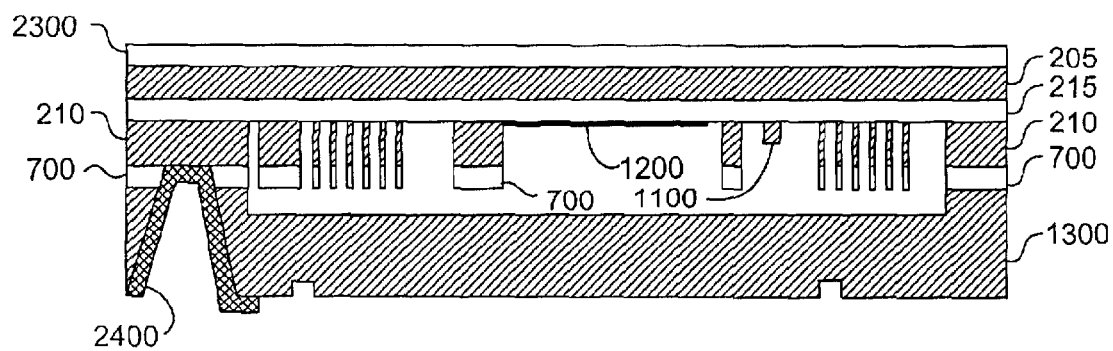
Figure 25:
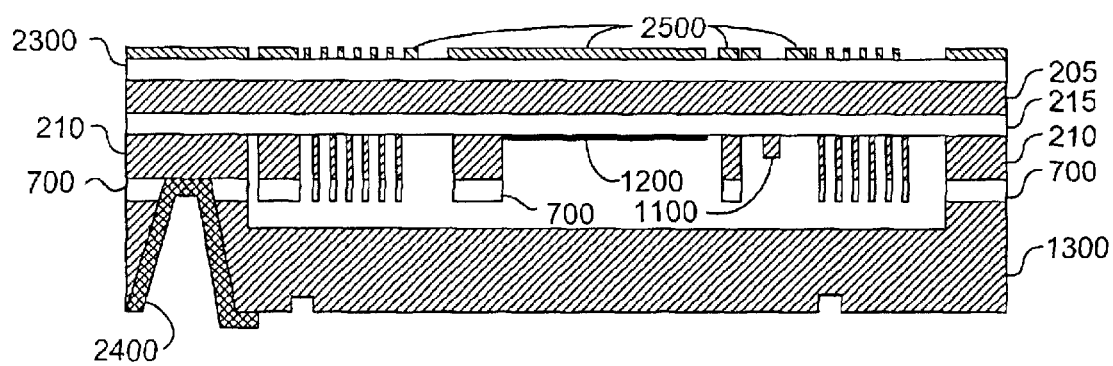

Continuing to FIG. 23, another oxide layer 2300 is formed on the top surface of silicon layer 205 using either chemical vapor deposition or sputter deposition. The pads (not shown) and vias, one of which is depicted in FIG. 24, are then metalized using a conventional metalization process that employs a shadow mask. Via 2400 contacts the underside of silicon layer 210 at a portion that will become the body of comb 109 (FIG. 1B) of the bottom half of the actuator under fabrication.

Figure 26:
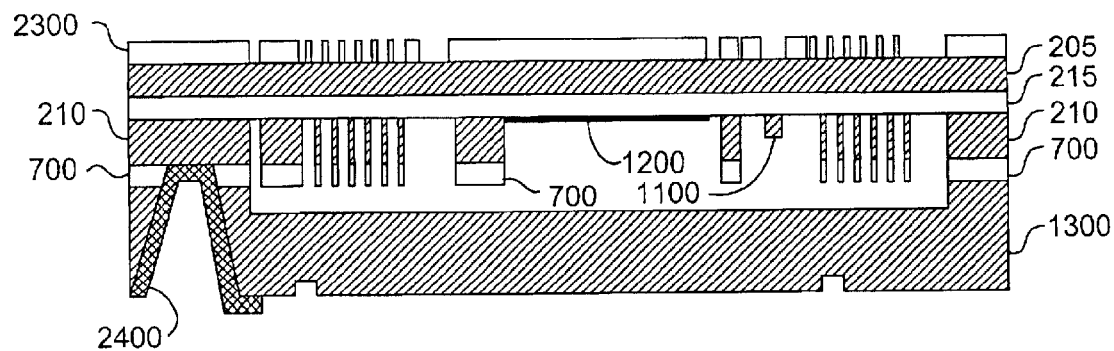

Most of the features of bottom layer 100 of FIG. 1B have been defined at this stage in the process sequence. The process of patterning the structures required to form top half 105 begins with a photoresist mask 2500 depicted in FIG. 25. The upper surface of oxide layer 2300 is dry etched through mask 2500 to expose the underlying silicon layer 205. The resulting structure is depicted in FIG. 26.

Figure 27:
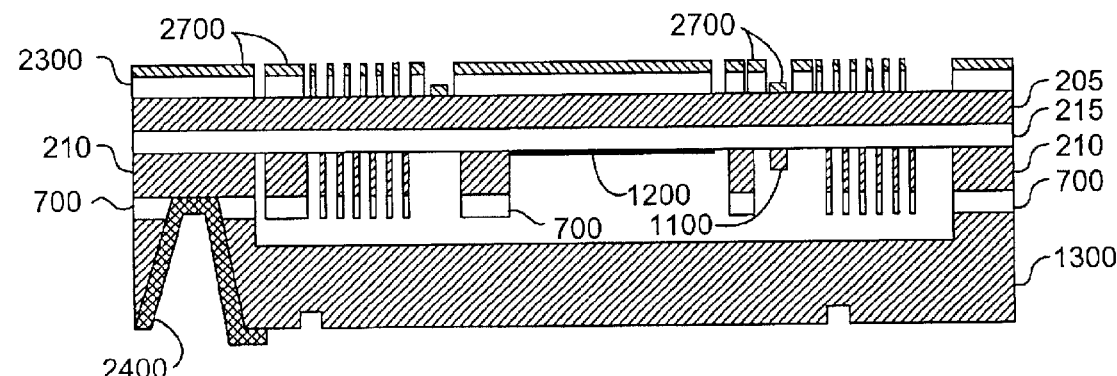
Figure 28:
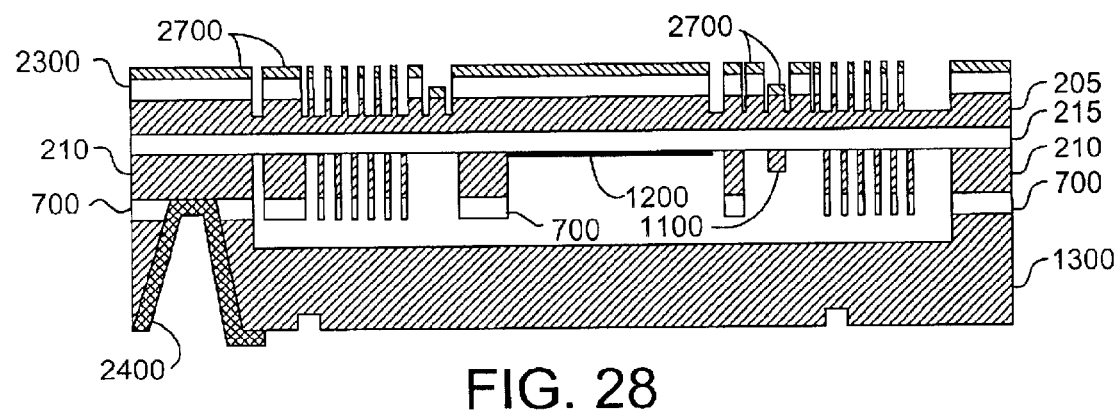

Turning to FIG. 27, a photoresist layer 2700 is applied over each feature of the oxide mask patterned in layer 2300, and additionally over those portions of silicon layer 205 that will form hinges 125 and hinge portions 119T. Those portions can be identified in FIG. 27 as the portions of photoresist layer 2700 deposited directly on the surface of silicon layer 205. The top surface of the resulting structure is then subjected to a silicon RIE process that removes a desired thickness of the exposed portions of silicon layer 205. This etch step defines the thickness of the upper half of hinges 125 and hinge portions 119T, the portions depicted in upper half 105 of FIG. 1A. The resulting structure is depicted in FIG. 28.

Figure 29:
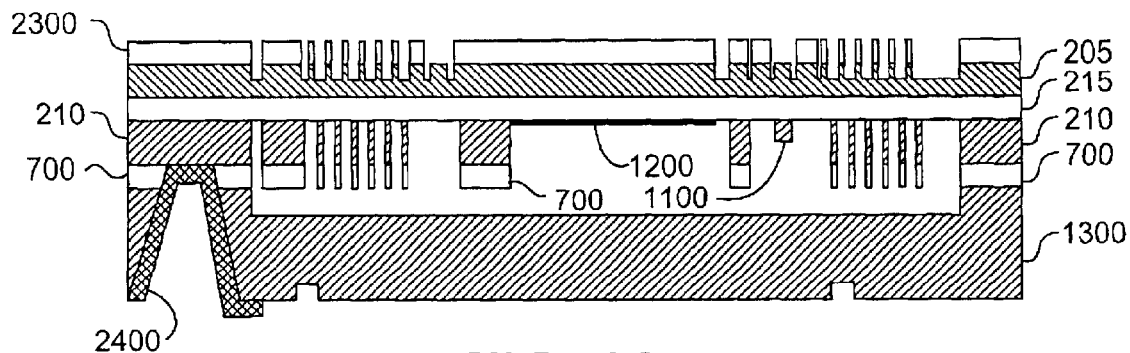
Figure 30:
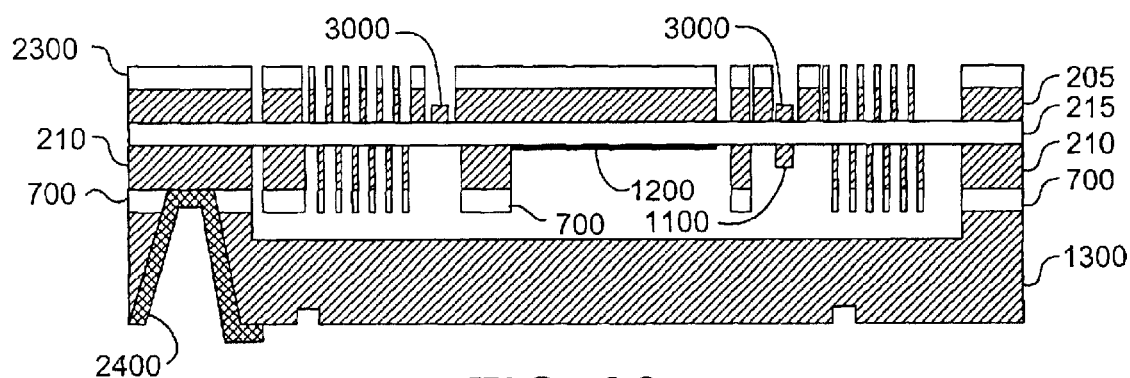
Figure 31:
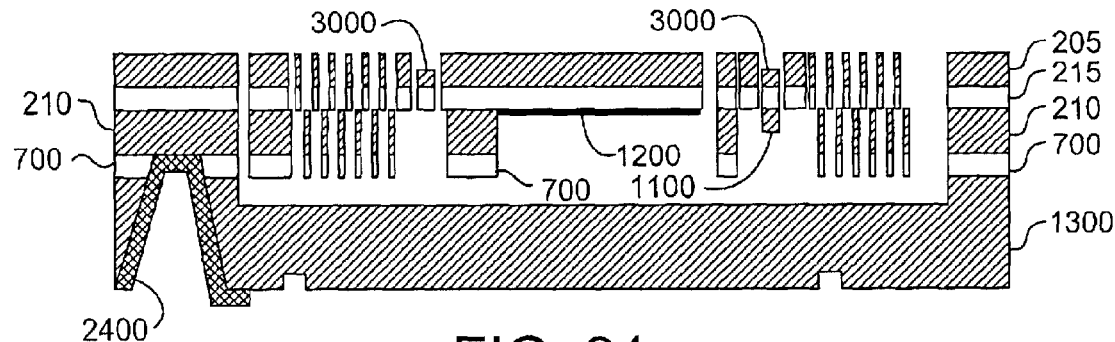

Patterned mask layer 2700 is then removed (FIG. 29). Another RIE then removes the remaining silicon in the thinned portions of silicon layer 205. As shown in FIG. 30, those portions of silicon layer 205 protected from the first RIE step of FIG. 28, being thicker than the other etched portions of layer 205, leave features 3000 to form the upper portion of hinges 125 and hinge portions 119T. Like structures 1100, which form the bottom half of the hinges, structures 3000 are formed thinner than adjacent elements to adjust hinge flexibility. The resulting structure is subjected to a silicon-dioxide etch to remove oxide layer 2300 and those portions of oxide layer 215 that connect adjacent elements depicted in the cross section of FIG. 30, thereby producing the structure of FIG. 31.

Figure 32:
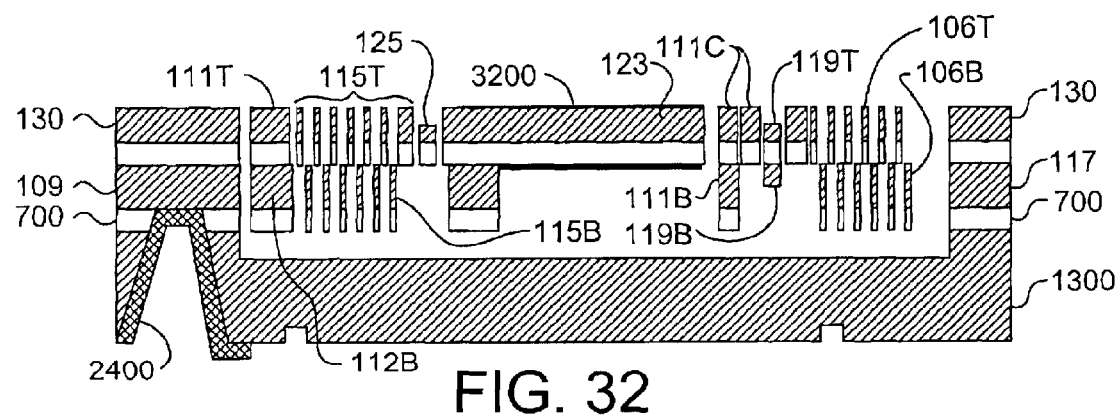

Alternatively, oxide layer 2300 is removed through a shadow mask that allows oxide etching over the whole surface except the portion that will become actuated member 123. In the resulting embodiment, the actuated member is coated with an oxide layer on both principal surfaces to minimize mirror distortion. Finally, a reflective surface (a mirror) 3200 is added to silicon layer 205. In this case, mirror 3200 is formed by depositing first chromium and then gold onto layer 205 through a shadow mask. The completed structure, illustrated in FIG. 32, is annotated using the numbers introduced in FIGS. 1A and 1B to identify the actuator structures shown in the cross section in FIG. 32. One feature not shown in FIGS. 1A and 1B is the actuator support formed from silicon layer 1300.

As is apparent from FIG. 32, teeth 106T (115T) and the underlying teeth 106B (115B) appear interdigitated from a perspective normal to mirror 3200, but not from a perspective normal to the cross section of FIG. 32. However, the teeth can be drawn toward one another, and therefore actually interdigitated, by applying a sufficient voltage between the upper and lower teeth. The ability to interdigitate the opposing teeth minimizes the clearance, increases the efficiency, and reduces the voltage required to produce a desired deflection angle.

The cross section of FIG. 32 differs slightly from what would be obtained along line A–A' of FIGS. 1A and 1B. For example, the number of comb teeth differs, and the layers and patterns are not to scale. Such variations are commonly used to simplify the description of the process, as is well understood by those of skill in the art. In an actual embodiment, combs 113, 115, 106, and 108 might have 10–100 teeth, for example, and the teeth might be 5–20 microns wide and 200–500 microns long.

Figure 33A:
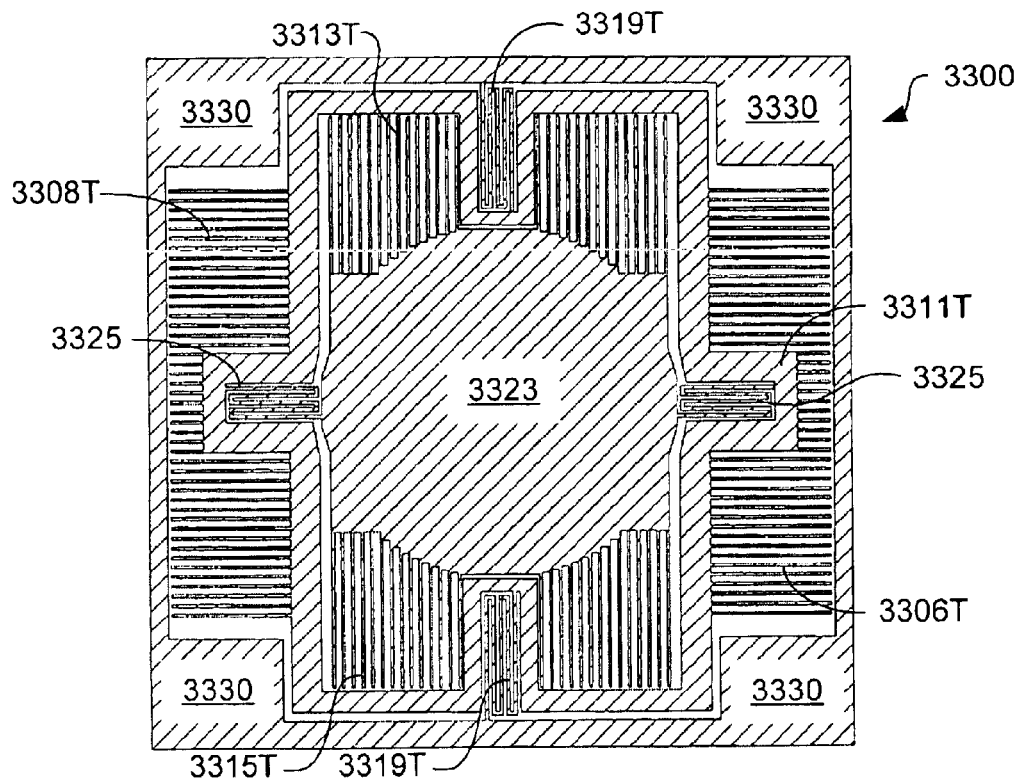
FIGS. 33A and 33B are plan views depicting the top and bottom halves 3300 and 3310 of an actuator in accordance with another embodiment of the invention.
Figure 33B:
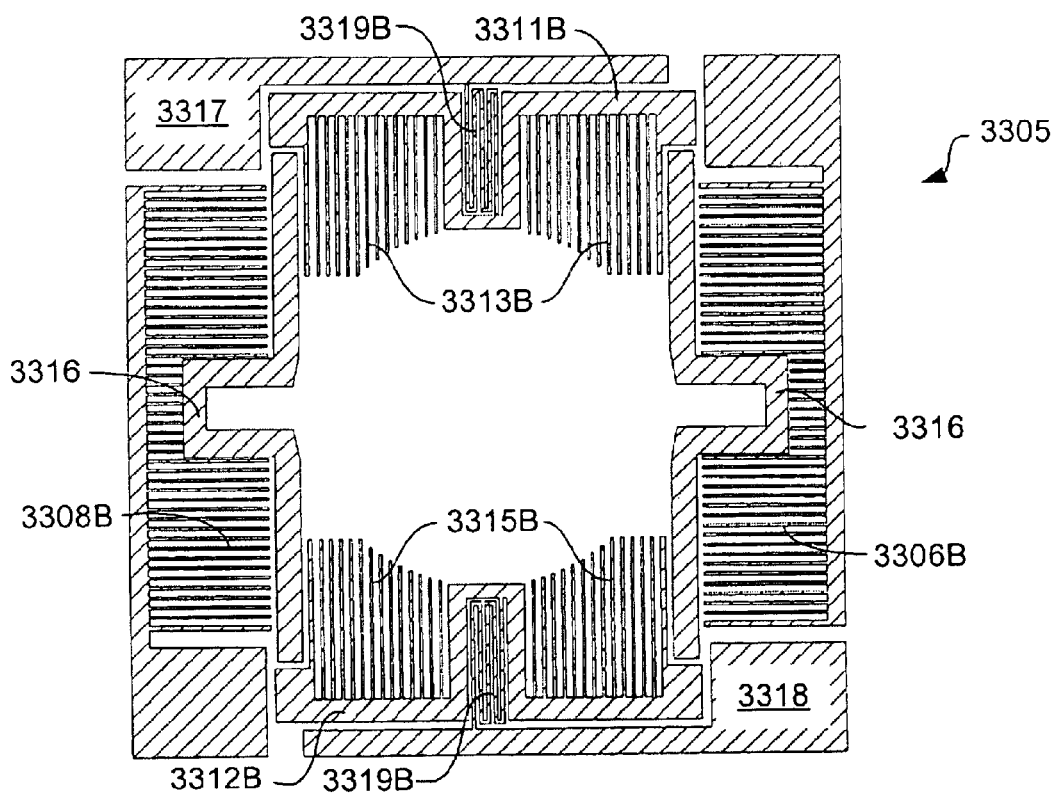

FIGS. 33A and 33B are plan views depicting the respective top and bottom halves 3300 and 3305 of an actuator in accordance with another embodiment of the invention. The actuator depicted in FIGS. 33A and 33B is functionally similar to the one depicted in FIGS. 1A and 1B. However, the structure of FIGS. 33A and 33B employs a different comb configuration, as is obvious from the plan views, and also includes more flexible serpentine hinges. The serpentine hinges can be made the same thickness as other elements (e.g., the comb teeth), or can be made thinner using the process shown in connection with FIGS. 2 through 32.

The distance from the tip of teeth 3306, 3308, 3313 and 3315 to their rotational axes are longer than in the embodiment of FIGS. 1A and 1B. Therefore, the torque generated by the same voltage difference is increased. Mirror teeth 3313T and 3315T with variant teeth length are attached to the mirror directly and to surrounding silicon 3330 via hinges 3325, frame 3311T, and hinge portions 3319T. Variable teeth length is important for linearization of voltage response and damping of resonances. Frame teeth 3313B and 3315B are arranged interdigitally with mirror teeth 3313T and 3315T and connected to electrodes 3317 and 3318 independently through hinge portions 3319B. A voltage difference can be applied between 3313T and 3313B or between 3315T and 3315B to rotate the mirror with respect to the frame in the axis defined by hinges 3325. The frame teeth 3306T and 3308T are also arranged interdigitally with the stationary comb teeth 3306B and 3308B to rotate the mirror/frame with respect to the axis defined by the hinges formed of top and bottom hinge portions 3319T/B. Two separated frame portions 3316 are designed to increase the frame rigidity without increasing the electrostatic coupling between different sets of teeth, 3306 and 3313. Also important, the actuator is designed so that the reflective surface 3323 is as great a percentage of the total actuator area (including the exposed portions of the actuator support) as practical, which is over 25% in the depicted embodiment.

FIGS. 34–49 depict an alternate fabrication process, referred to here as the "pattern transfer" process, that can be used to fabricate MEMS actuators in accordance with the invention. FIGS. 34–49 depict the device in cross section, with the resulting structure appearing similar to the device of FIGS. 1A and 1B cut along line A–A'.

Figure 34:
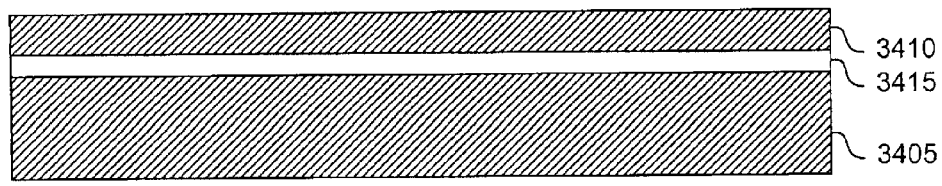
FIGS. 34–49 depict an alternate fabrication process, referred to here as the "pattern transfer" process, that can be used to fabricate MEMS actuators in accordance with the invention.
Figure 35:
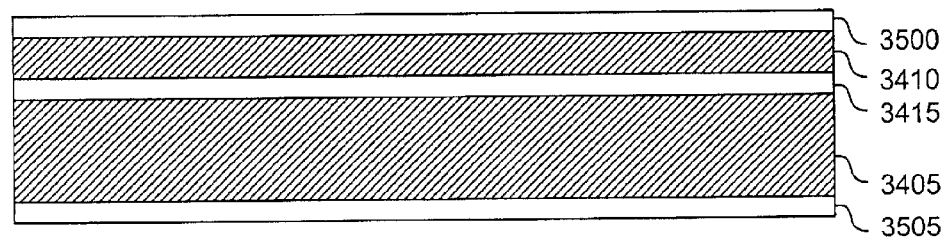

FIG. 34 depicts a wafer 3400 that includes a layer of handle silicon 3405 connected to a 20–100 micron thick device silicon layer 3410 via a 1–2 micron thick layer 3415 of silicon dioxide or spin-on glass. As depicted in FIG. 35, the exposed surfaces of silicon layers 3405 and 3410 are coated with silicon dioxide mask layers 3500 and 3505. Silicon layers 3405 and 3410 are both doped, either n-type or p-type, and have a resistivity of about 5 to 100 ohms-cm in one embodiment.

Figure 36:
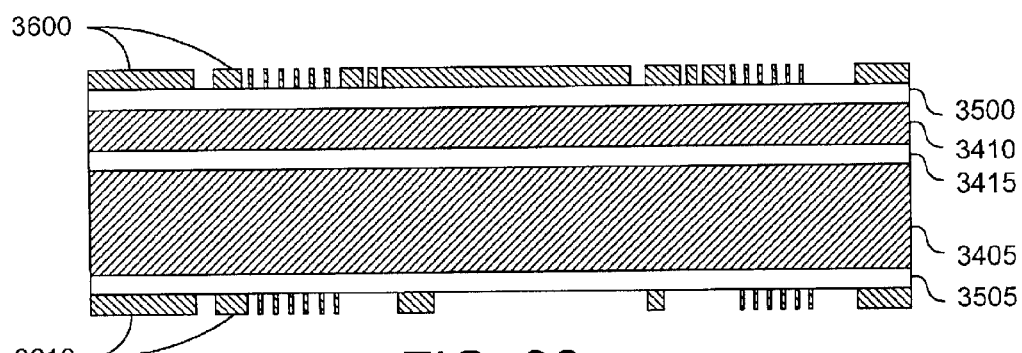
Figure 37:
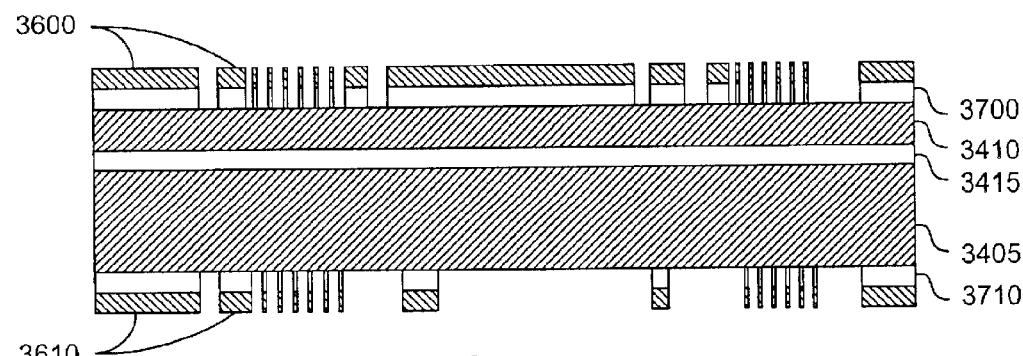
Figure 38:
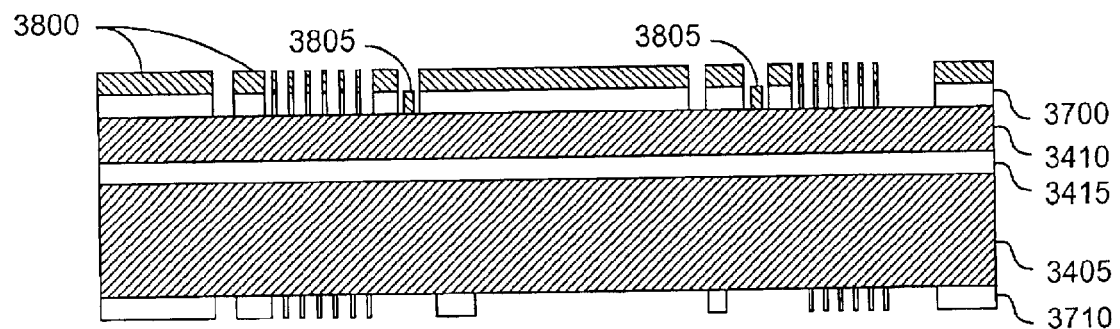

A layer of photoresist is patterned over each of respective oxide layers 3500 and 3505 to create a pair of masks 3600 and 3610 (FIG. 36). The exposed portions of oxide layers 3500 and 3505 are then subjected to a dry silicon-dioxide each, leaving oxide masks 3700 and 3710. Masks 3600 and 3610 are then removed, and the upper surface of the resulting structure is subjected to another photolithographic patterning step that forms the hinge patterns 3805, leaving the structure of FIG. 38. Optionally, layer 3505 can be a metal film, such as aluminum, chromium, or titanium, and mask 3610 can be formed of oxide. In such embodiments, the metal layer is etched using metal etches rather than oxide etches.

Figure 39:
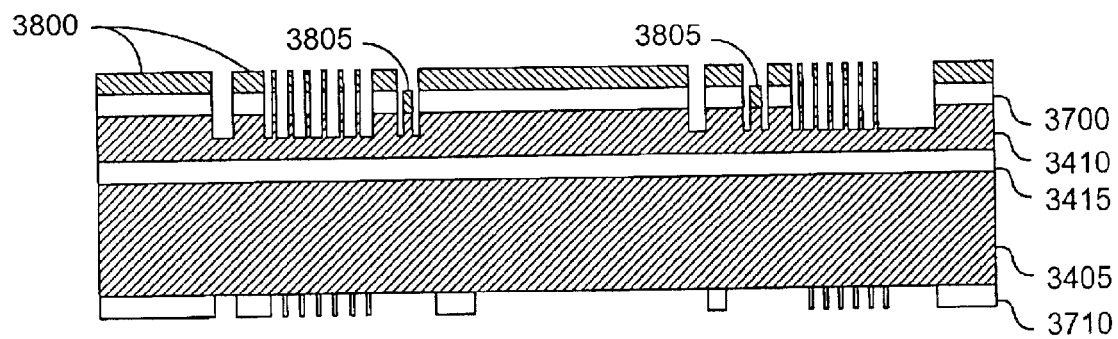
Figure 40:
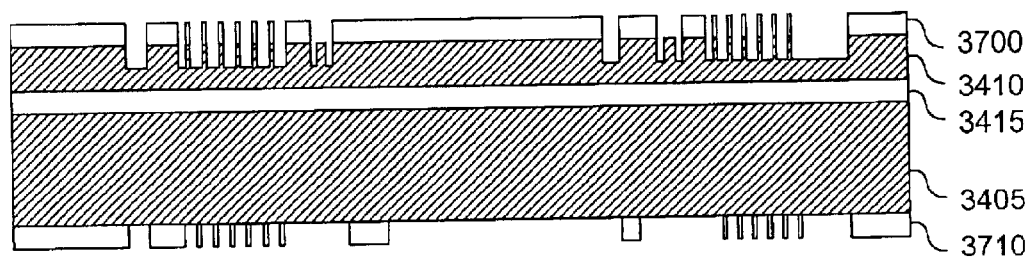
Figure 41:
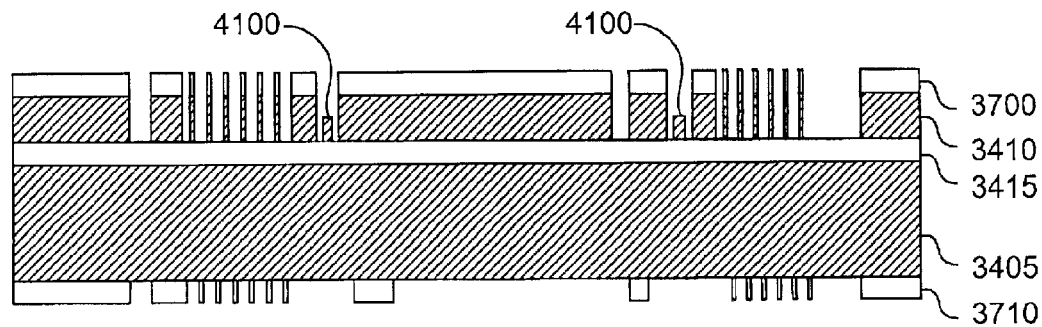

Next, a silicon RIE removes a desired depth of device layer 3410, leaving the structure of FIG. 39. Mask 3800 is then removed, leaving the structure of FIG. 40. A second silicon RIE then removes the remaining unmasked silicon of layer 3410 down to oxide layer 3415, which acts as an etch-stop layer (FIG. 41). Portions 4100 of silicon layer 3410 that will later become hinges 125 and hinge portions 119T are left adhered to oxide layer 3415. The hinges undergo this fabrication sequence to make them thinner, and consequently more flexible, than surrounding device features. When it is desired to keep the hinges of the same thickness as the teeth, the steps of FIGS. 38–42 are skipped.

Figure 42:
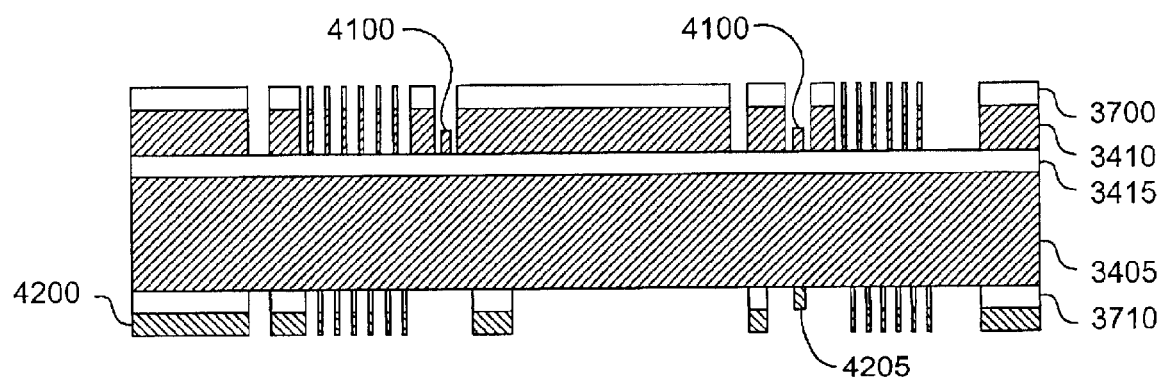
Figure 43:
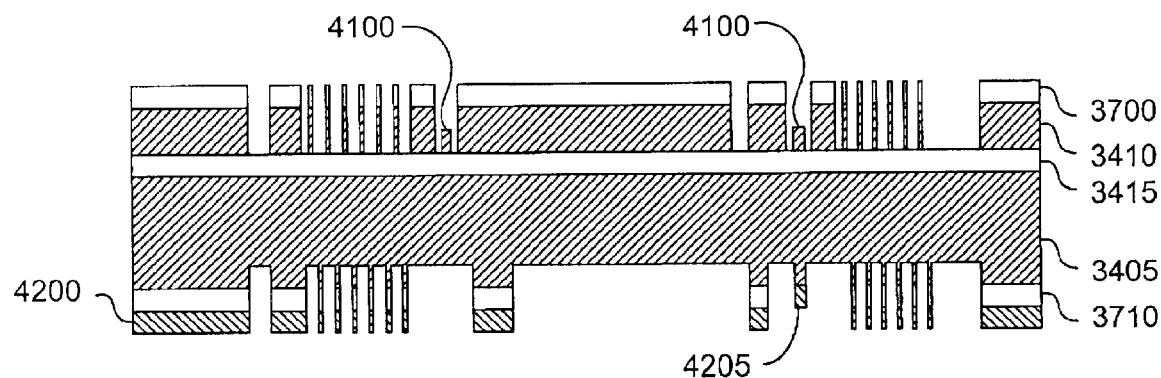
Figure 44:
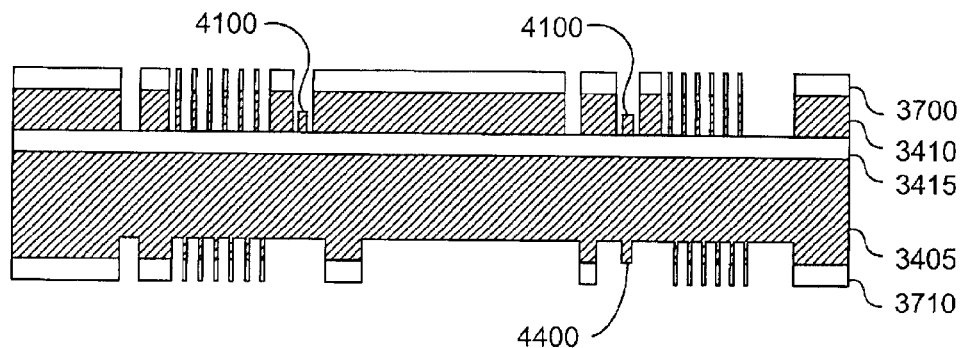

In the next step, a photoresist layer 4200 is patterned over the oxide mask 3710, with the addition of the portion 4205 that masks what will become hinge portion 119B (FIG. 42). Next, the lower surface of silicon layer 3405 is subjected to a silicon RIE that removes a desired thickness of the exposed portions of silicon layer 3405. This etch step defines the thickness of hinge portions 119B of FIG. 1B. The resulting structure is depicted in FIG. 43. The photomask is then removed, leaving the structure of FIG. 44, which includes a raised element 4400.

Figure 45:
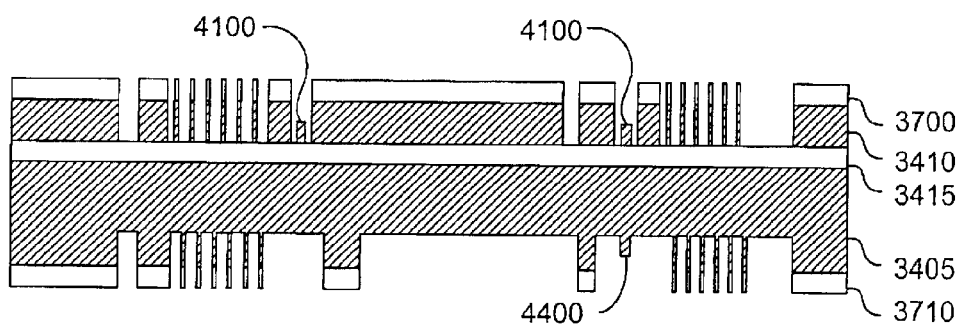
Figure 46:
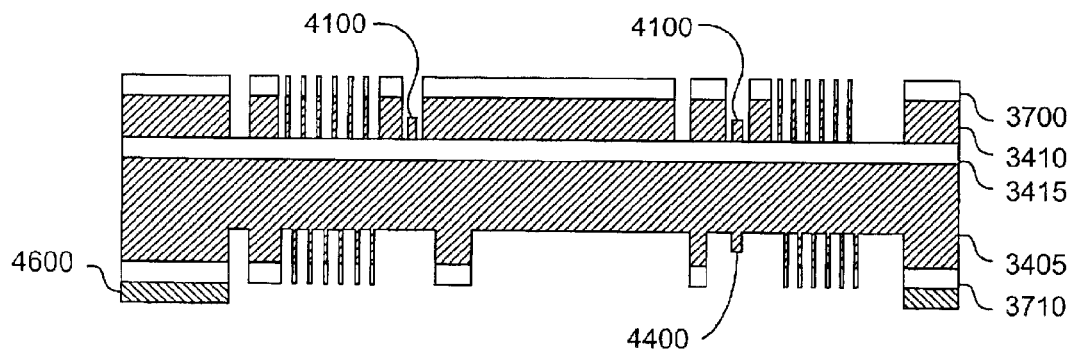

Another silicon RIE then removes a second desired thickness of the exposed portions of silicon layer 3405. This step defines the thickness of what will become the comb teeth of bottom portion 100 of the actuator of FIGS. 1A and 1B. FIG. 45 depicts the resulting structure.

Figure 47:
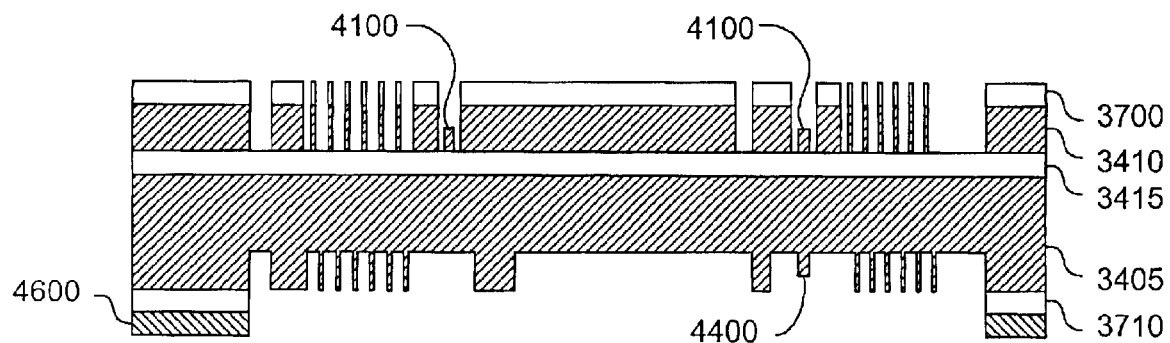
Figure 48:
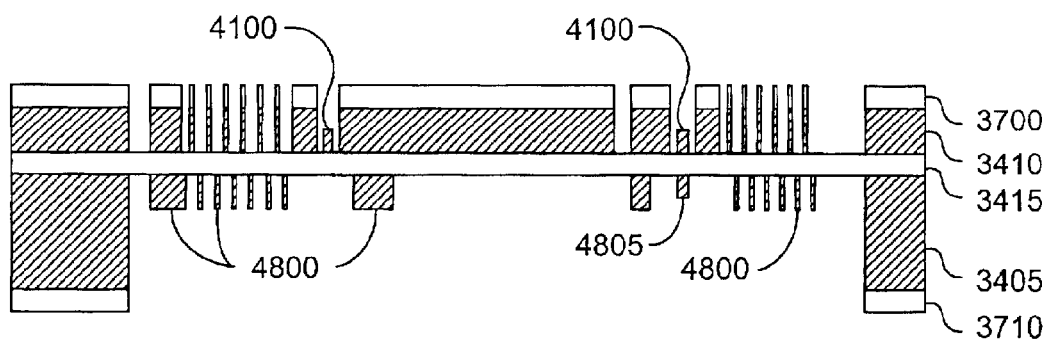

Another photoresist mask 4600 is added by spray coating to protect portions of oxide mask 3710 (FIG. 46); the exposed portions of oxide mask 3710 are then removed using a dry silicon-dioxide etch step. FIG. 47 depicts the resulting structure. The remaining silicon in the thinned portions of silicon layer 3405 is then removed using another RIE, with oxide layer 3415 acting as an etch-stop layer. As shown in FIG. 48, those portions of silicon layer 3405 protected from previous RIE steps, being thicker than the other etched portions of layer 3405, leave features 4800 and 4805. Features 4800 and 4805 will form the bottom combs (115B and 106B) and hinge portion 119B, respectively, of FIG. 1B.

Figure 49:
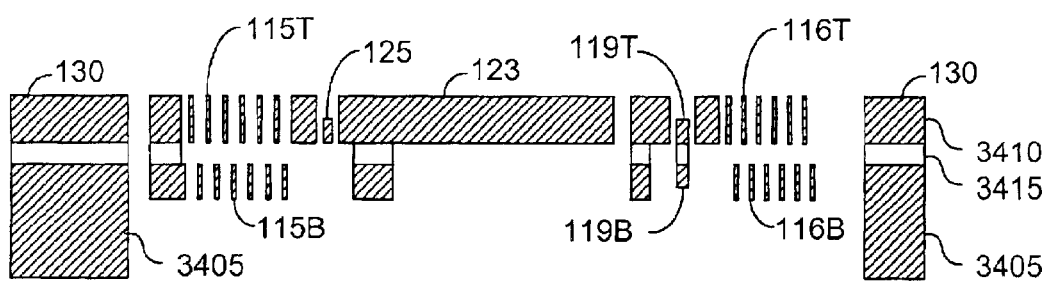

Finally, the structure of FIG. 48 is subjected to a silicon-dioxide etch to remove oxide layers 3700 and 3710, and to remove those portions of oxide layer 3415 that connect adjacent elements depicted in the cross section of FIG. 48. Though not shown, a reflective surface is subsequently added to silicon layer 3410. The completed actuator, illustrated in FIG. 49, is annotated using some of the numbers introduced in FIGS. 1A and 1B to identify the actuator structures shown in the cross section. As with the previous example of FIG. 32, the cross section of FIG. 32 differs slightly from what would be obtained along line A–A' of FIGS. 1A and 1B. What remains of silicon layer 3405 forms the actuator support.

As noted above, the process of FIGS. 34–49 is referred to as a "pattern transfer" process. The name "pattern transfer" refers to the steps by which a pattern is formed on one surface and transferred to another. Such a pattern transfer is shown, for example, in FIGS. 41–48. In FIGS. 41–47, the bottom surface of silicon layer 3405 (a first material layer) is patterned to include features similar to the combs, hinges, etc., of bottom half 100 of the MEMS actuator of FIGS. 1A and 1B. This pattern is then "transferred" to the bottom surface of a second material layer, oxide layer 3415 (FIG. 48), by etching silicon layer 3405 until oxide layer 3415 is exposed between elements of the pattern. The original elements of the pattern, shown in e.g. FIG. 47, are wholly or partially consumed in the etch process that culminates in the structure of FIG. 49.

FIGS. 50–65 depict an alternate fabrication process, referred to herein as "deep-well lithography," that can be used to fabricate MEMS actuators in accordance with the invention. FIGS. 50–65 depict the device in cross section, with the resulting structure appearing similar to the device of FIGS. 1A and 1B cut along line A–A'.

Figure 50:
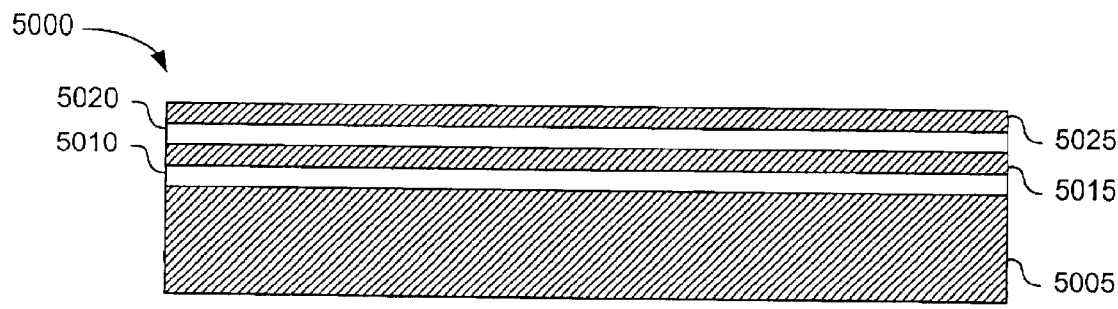
FIGS. 50–65 depict an alternate fabrication process, referred to here as "deep-well lithography," that can be used to fabricate MEMS actuators in accordance with the invention.

FIG. 50 depicts a wafer 5000 that includes a layer of handle silicon 5005 covered with a silicon-dioxide layer 5010, a device silicon layer 5015, a second silicon-dioxide layer 5020, and a second device silicon layer 5025. Device silicon layers 5015 and 5025 are each about 20–100 microns thick; oxide layers 5010 and 5020 are each between one and two microns thick. Silicon layers 5005, 5015, and 5025 are doped, either n-type or p-type, and have a resistivity of about 5 to 100 ohms-cm in one embodiment.

Figure 51:
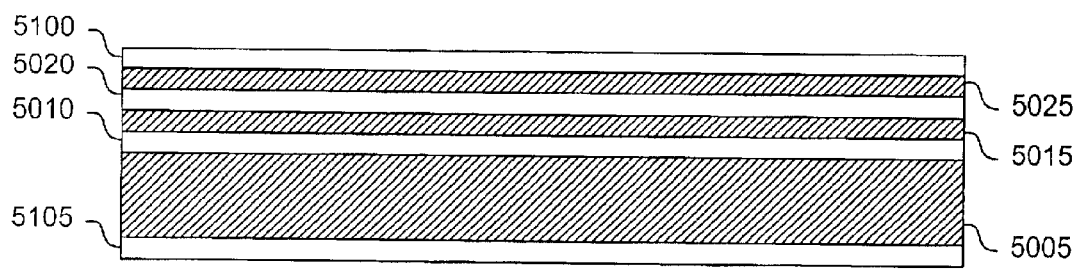
Figure 52:
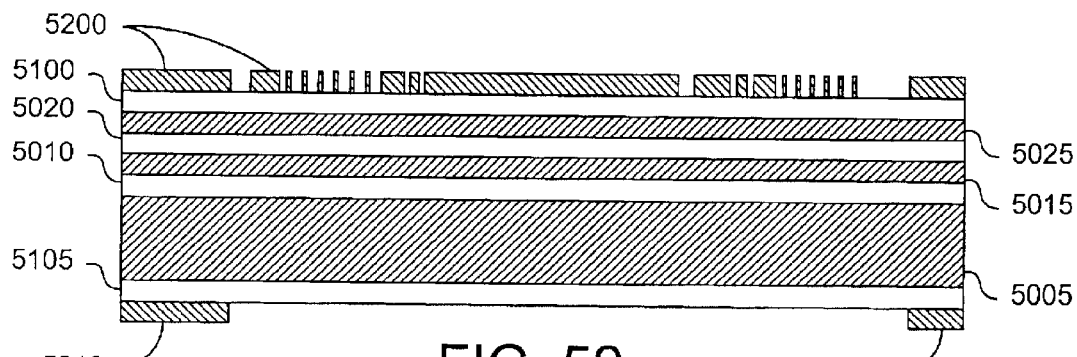
Figure 53:
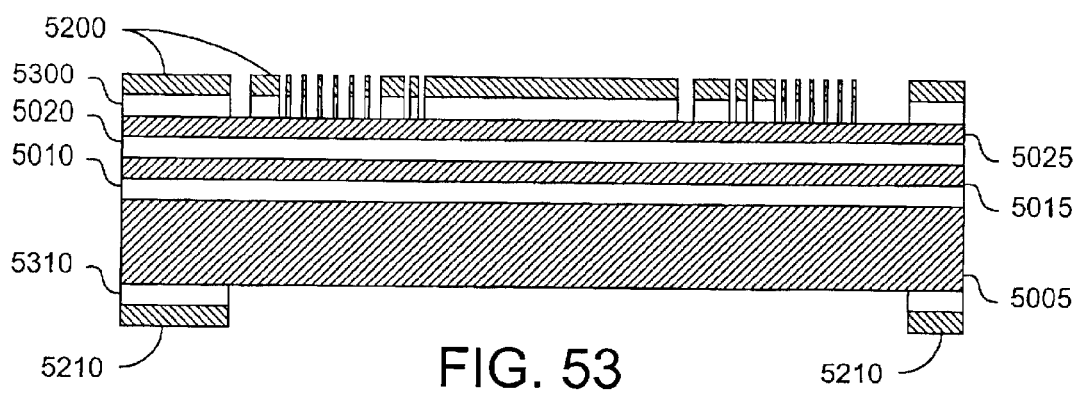
Figure 54:
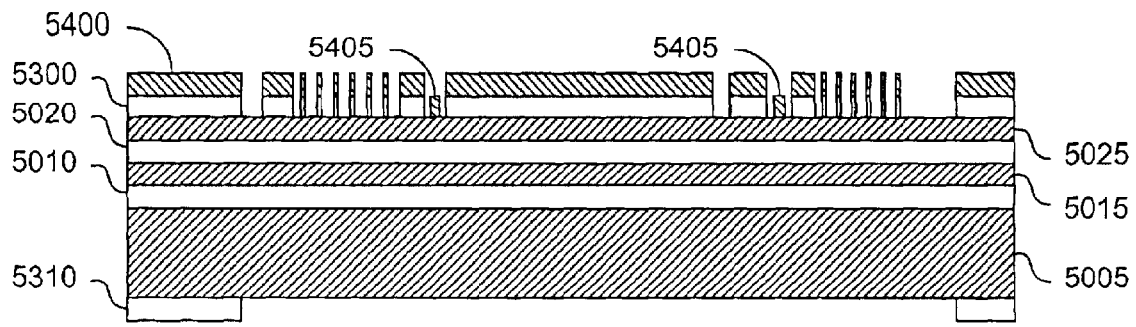

As depicted in FIG. 51, the exposed surfaces of silicon layers 5005 and 5025 are coated with respective silicon dioxide mask layers 5105 and 5100. Next, a layer of photoresist is patterned over each of respective oxide layers 5100 and 5105 to create a pair of masks 5200 and 5210 (FIG. 52). The exposed portions of oxide layers 5100 and 5105 are then subjected to a dry silicon-dioxide etch, leaving oxide masks 5300 and 5310. Masks 5200 and 5210 are then removed, and another photoresist layer 5400 is patterned over the oxide mask 5300 with the additional patterns 5405 that are to become hinges 125 and hinge portions 119T (FIG. 54).

Figure 55:
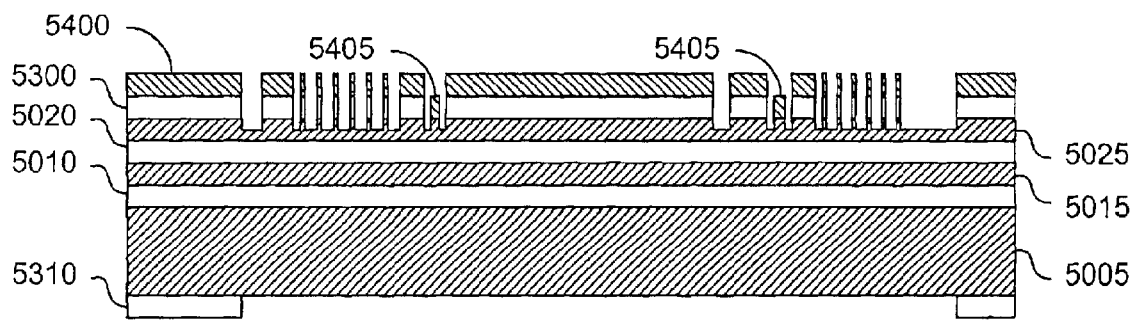
Figure 56:
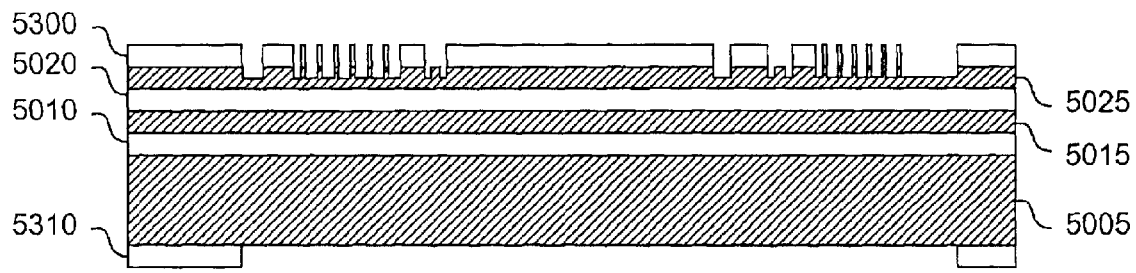

Next, the upper surface of the resulting structure is subjected to a silicon RIE to remove a desired thickness of device layer 5025, leaving the structure of FIG. 55. The photoresist layer 5400 is then removed, leaving the structure of FIG. 56.

Figure 57:
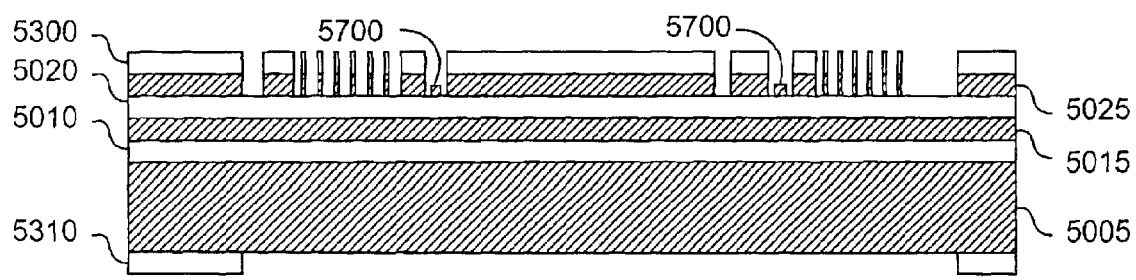

A second silicon RIE removes the remaining unmasked silicon of layer 5025 down to oxide layer 5020, which acts as an etch-stop layer (FIG. 57). Portions 5700 of silicon layer 5025 that will later become hinges 125 and hinge portions 119T are left adhered to oxide layer 5020. The hinges undergo this fabrication sequence to make them thinner, and consequently more flexible, than the surrounding device features. As in the previous examples, several of the foregoing steps can be eliminated if the hinges need not be thinner than surrounding device features.

Figure 58:
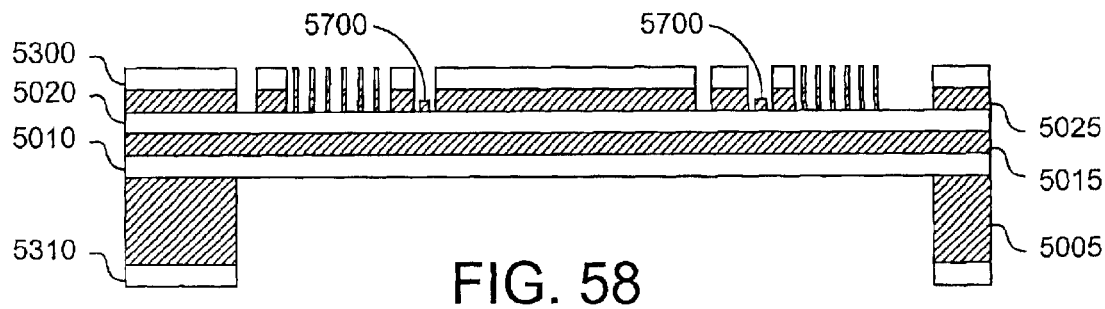
Figure 59:
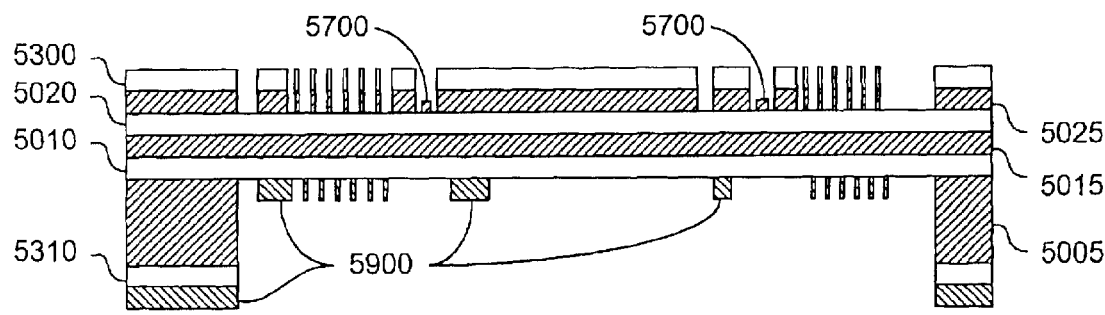
Figure 60:
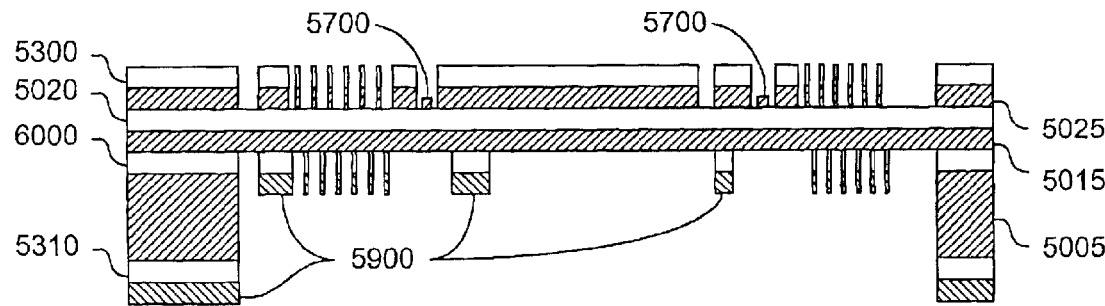
Figure 61:
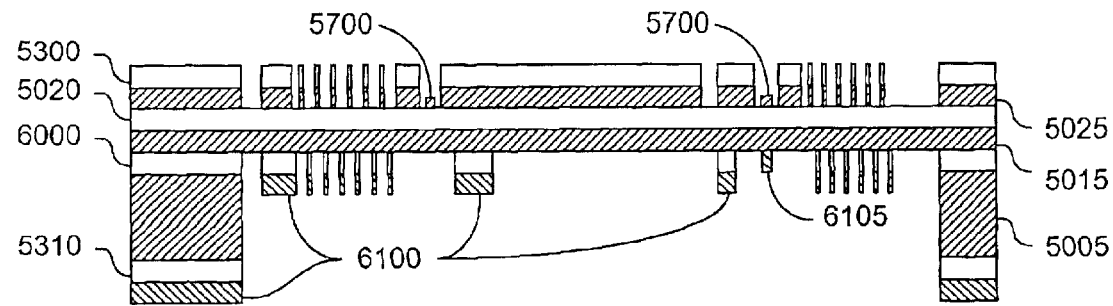

In the next step, another RIE removes the unmasked portion of silicon layer 5005 down to oxide layer 5010, which acts as an etch-stop layer (FIG. 58). Turning to FIG. 59, a photoresist mask 5900 is then applied by spray coating to oxide layer 5010 before the lower surface of silicon layer 5010 is subjected to a dry silicon-dioxide etch process that removes exposed portions of oxide layer 5010 to form a mask 6000 (FIG. 60). Photoresist mask 5900 is then removed, and another photoresist layer 6100 is patterned over the oxide mask 6000, with the addition of the portion 6105 that will become hinge portion 119B. The resulting structure is depicted in FIG. 61.

Figure 62:
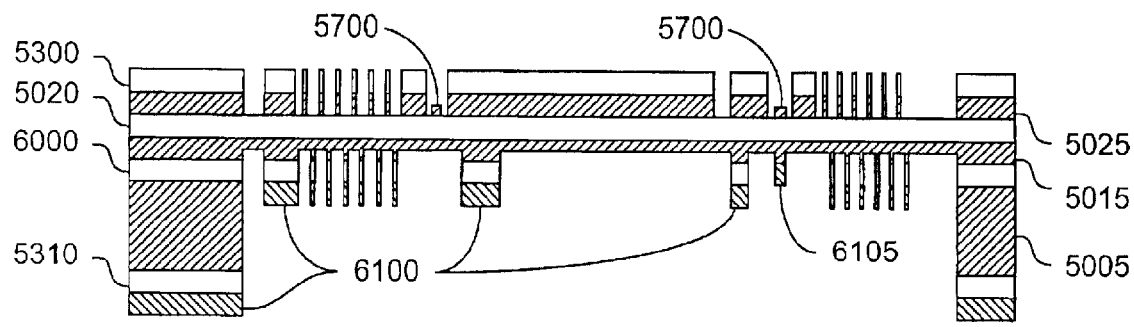
Figure 63:
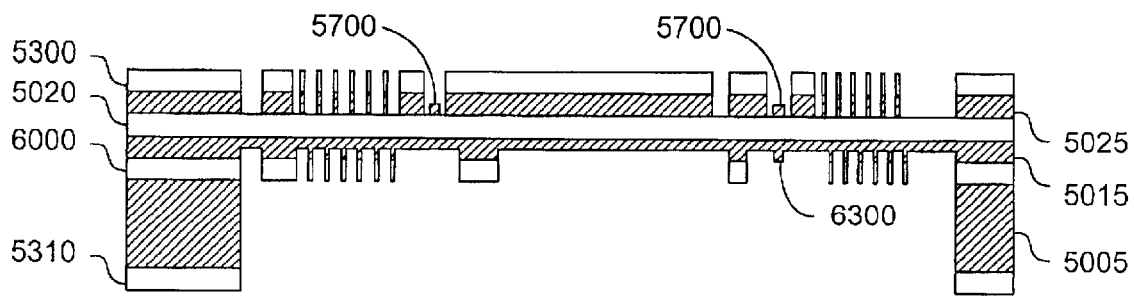

Next, as shown in FIG. 62, a desired thickness of the exposed portions of silicon layer 5015 is etched away using an RIE. This etch step defines the thickness of hinge portions 119B of FIG. 1B. The resulting structure, after removing photoresist 6100 (FIG. 63), includes an element 6300.

Figure 64:
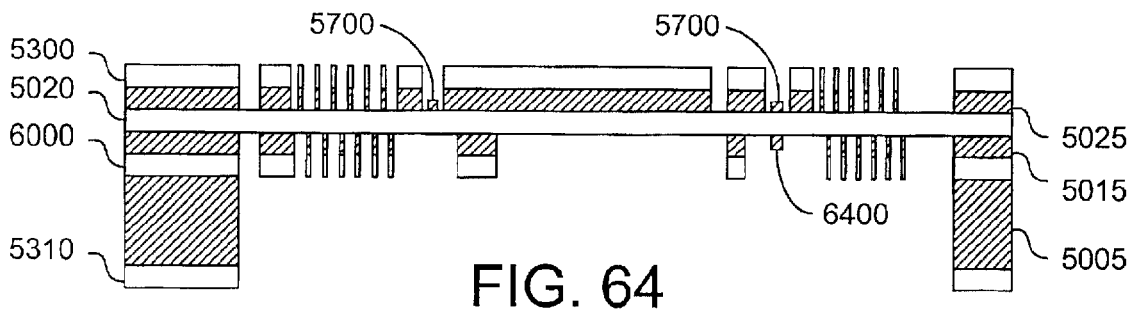

Another RIE removes the remaining silicon in the thinned portions of silicon layer 5015, with oxide layer 5020 acting as an etch-stop layer. As shown in FIG. 64, the portion of silicon layer 5015 protected from previous reactive-ion etching, being thicker than the other etched portions of layer 5015, leaves feature 6400 that will form hinge portion 119B of FIG. 1B. Once again, several of the foregoing steps can be eliminated if the hinges need not be thinner than surrounding device features.

Figure 65:
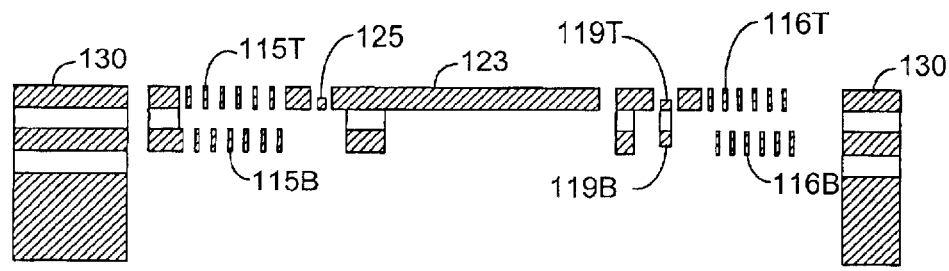

Finally, the structure of FIG. 64 is subjected to a silicon-dioxide etch to remove oxide layers 5300 and 5310, and to remove those portions of oxide layer 5020 that connect adjacent elements depicted in the cross section of FIG. 65. Though not shown, a reflective surface is then added to silicon layer 3410. The completed actuator is annotated using some of the numbers introduced in FIGS. 1A and 1B to identify the actuator structures shown in the cross section. As with the previous example of FIG. 32, the cross section of FIG. 65 differs slightly from what would be obtained along line A–A' of FIGS. 1A and 1B. What remains of silicon layer 5005 provides the actuator support.

As noted above, the process of FIGS. 50–65 is referred to as "deep-well lithography." The name refers to the steps by which a pattern is formed upon a surface that is below the uppermost surface of the structure being fabricated (i.e., in a well). Such a process is shown, for example, in FIGS. 59–64, during which silicon layer 5015 is patterned to form features of bottom half 100 of the MEMS actuator of FIGS. 1A and 1B.

Deep-well lithography differs from conventional lithography in that the surface being patterned is not the uppermost surface. The focal plane of the photolithography equipment must therefore be offset as appropriate to account for the depth of the well in which the pattern is to be formed. To form mask 5900 of FIG. 59, for example, the photolithography equipment is first focused on the top surface of oxide layer 5310 to define the well within which mask 5900 will be formed. The focal plane of the photolithography equipment is then adjusted to account for the combined thickness of silicon layer 5005 and oxide layer 5310 so that the exposure pattern is focused on the portion of mask layer 5900 in contact with oxide layer 5010. The offset can take into account the thickness of a material layer of uniform composition, or a material layer made up of two or more sub-layers (e.g., oxide layer 5310 and silicon layer 5005).

Figure 66A:
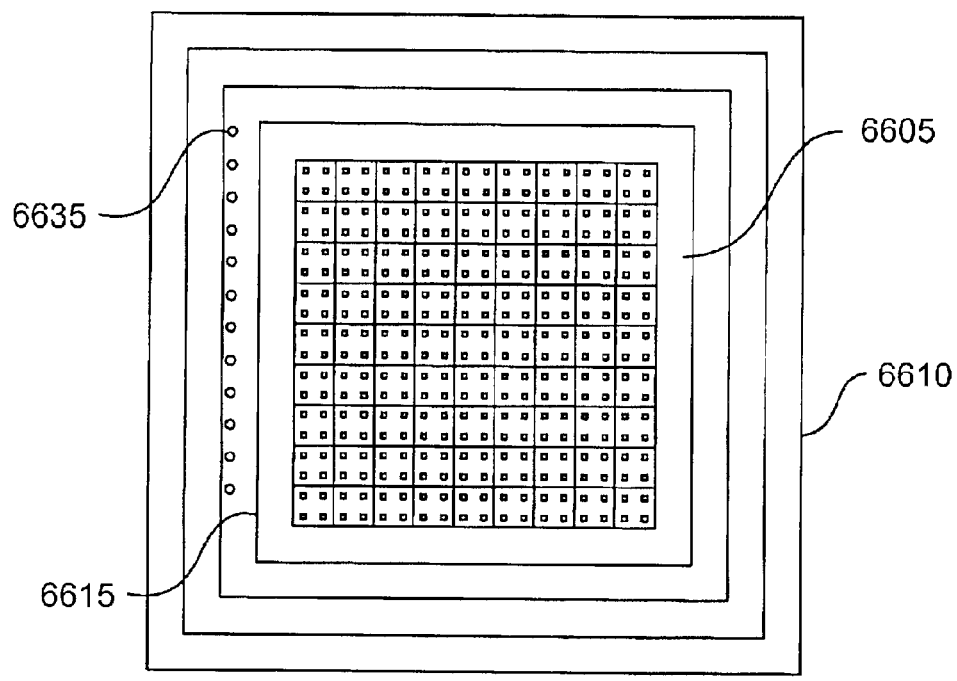
FIGS. 66A and 66B depict an optical switch 6600 in accordance with one embodiment of the invention.
Figure 66B:
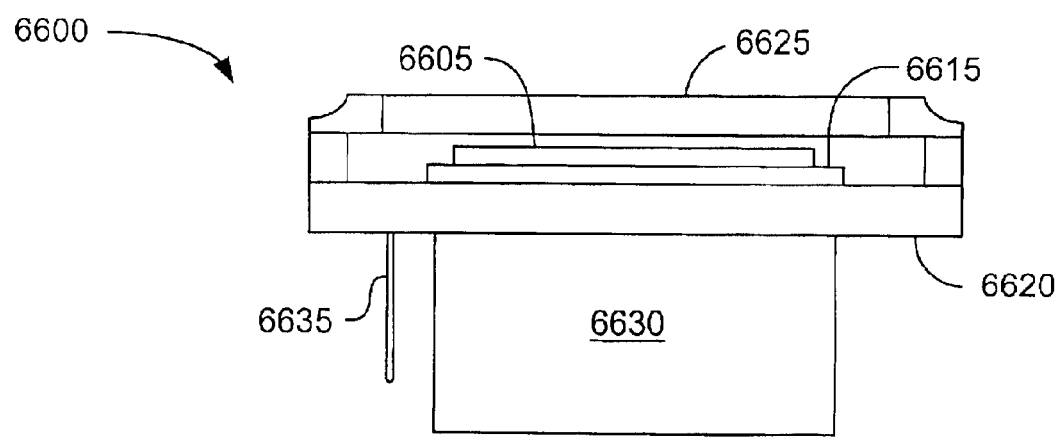

FIGS. 66A and 66B depict an optical switch 6600 in accordance with one embodiment of the invention. Switch 6600 includes a nine-by-nine mirror array 6605 hermetically sealed within a package 6610. Package 6610 protects the very fragile mirror array 6605 from physical and chemical hazards (e.g., dust and condensation), which can easily damage sensitive MEMS structures or interfere with device operation. Package 6610 is preferably assembled in an inert, low humidity environment.

Within package 6610, array 6605 is mounted on an integrated circuit 6615 that includes the requisite circuitry for controlling array 6605. Array 6615 is, in turn, mounted on a ceramic substrate 6620. Package 6610 is sealed using a window 6625, both primary surfaces of which include non-reflective coatings. A heat sink 6630 affixed to substrate 6620 dissipates heat generated by circuit 6615. A collection of feed-through pins 6635 conveys external signals, including power and ground, to circuit 6615.

Array 6605 includes 81 mirrors, and each mirror requires a number of electrical contacts. Other implementations will have more or fewer mirrors, and consequently require more or fewer electrical contacts. As the number of contacts increases, wirebond pad pitch limitations make it increasingly difficult to convey a sufficient number of control signals between circuit 6615 and array 6605. "Flip-chip" technology is used in some embodiments to solve this problem. For more information about flip-chip technology, see "Flip Chip Challenges," by Steve Bezuk, Applied Technology Development and Flip Chip, Kyocera America, Inc., which was first published in HDI Magazine, February 2000, and is incorporated herein by reference.

Figure 67A:
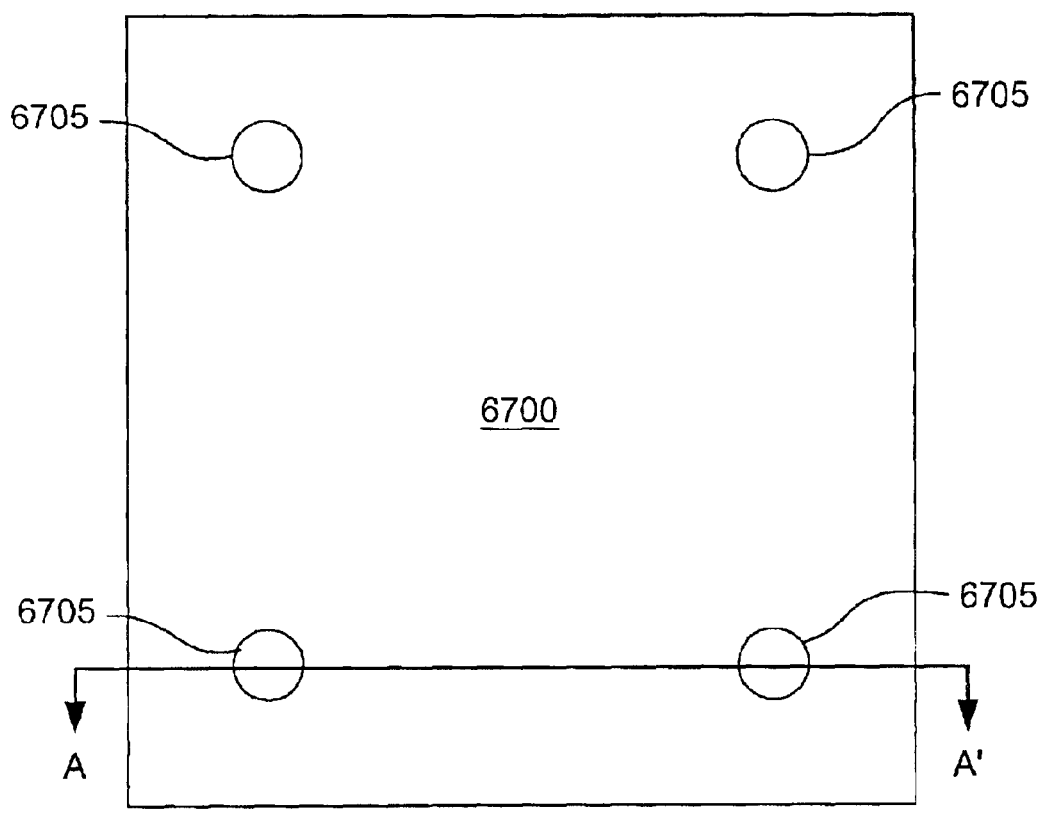
FIGS. 67A and 67B depict a packaging concept for MEMS actuators in accordance with one embodiment of the invention.
Figure 67B:
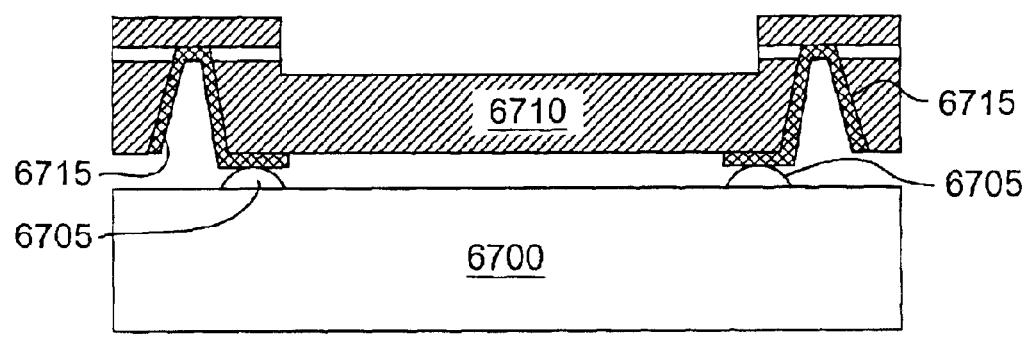

FIG. 67A depicts an application-specific integrated circuit (ASIC) 6700 that includes a collection of contact bumps 6705. FIG. 67B shows ASIC 6700 in cross-section along line A–A' of FIG. 67A, and additionally shows a portion of a MEMS actuator 6710 with electrical contacts (vias) 6715 positioned over and in contact with bumps 6705. Bumps 6705 can be conductive bonding material, such as solder or conductive epoxy; alternatively, bumps 6705 can be replaced with an anisotropic conductive film, provided MEMS actuator 6710 is sufficiently robust to withstand the compressive force required to make effective electrical contact through such material.

Figure 68A:
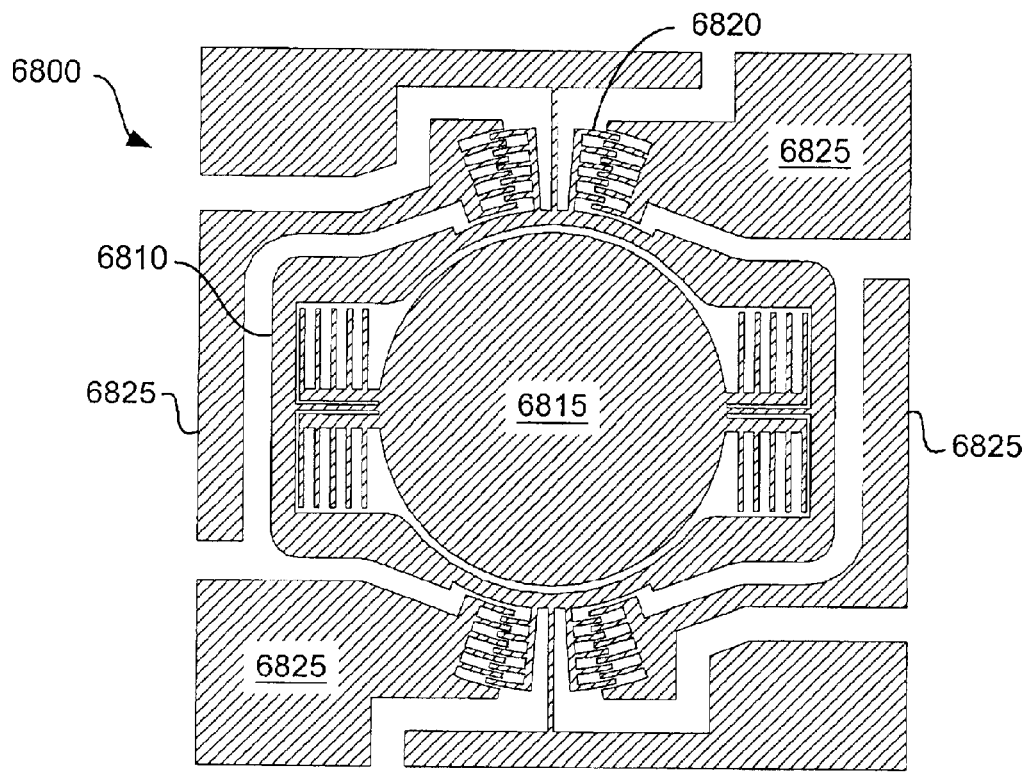
FIGS. 68A and 68B, respectively, are plan views of a top half 6800 and a bottom half 6805 of a multi-axis MEMS actuator in accordance with another embodiment of the invention.
Figure 68B:
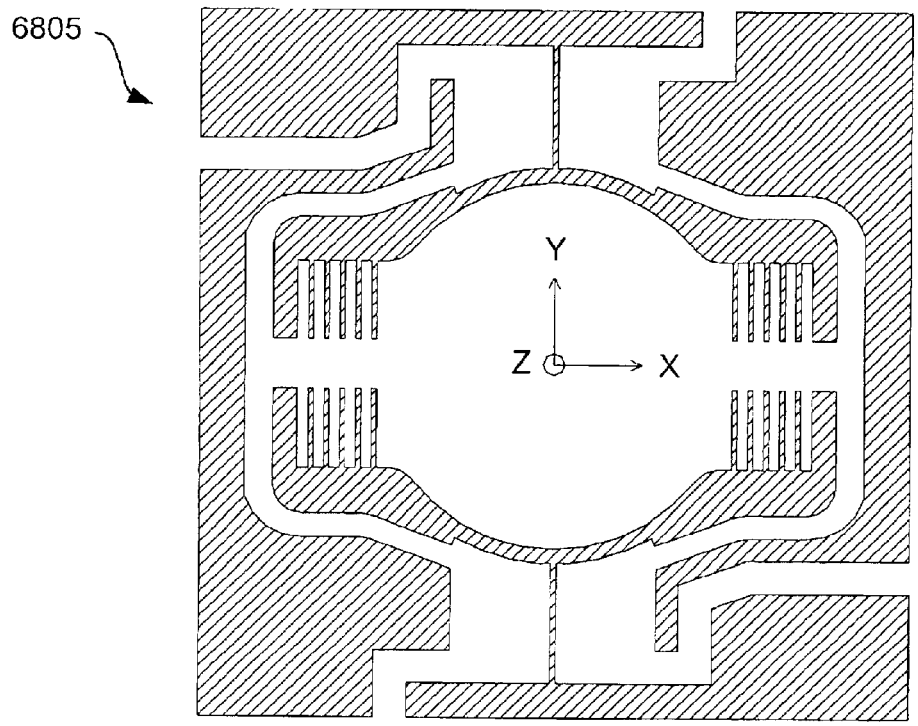

FIGS. 68A and 68B, respectively, are plan views of a top half 6800 and a bottom half 6805 of a multi-axis MEMS actuator in accordance with another embodiment of the invention. Top half 6800 includes a frame 6810 supporting an actuated member 6815. Frame 6810 includes a number of curved, moveable combs 6820 interdigitated with a corresponding number of fixed combs 6825. The actuator of FIGS. 68A and 6813 is similar to the actuator in FIGS. 1A and 1B, but additionally affords the ability to rotate member 6815 in the X-Y plane (FIG. 68B). The actuator of FIGS. 68A and 68B can be fabricated using any of the process sequences described above.

Figure 69A:
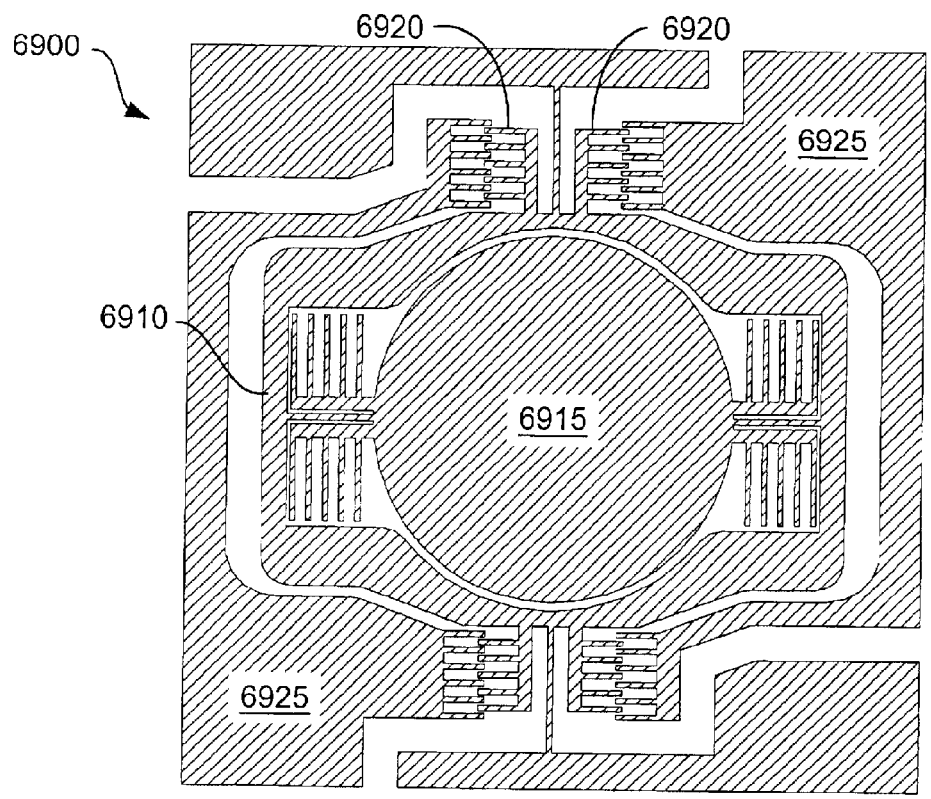
FIGS. 69A and 69B, respectively, are plan views of a top half 6900 and a bottom half 6905 of a multi-axis MEMS actuator in accordance with another embodiment of the invention.
Figure 69B:
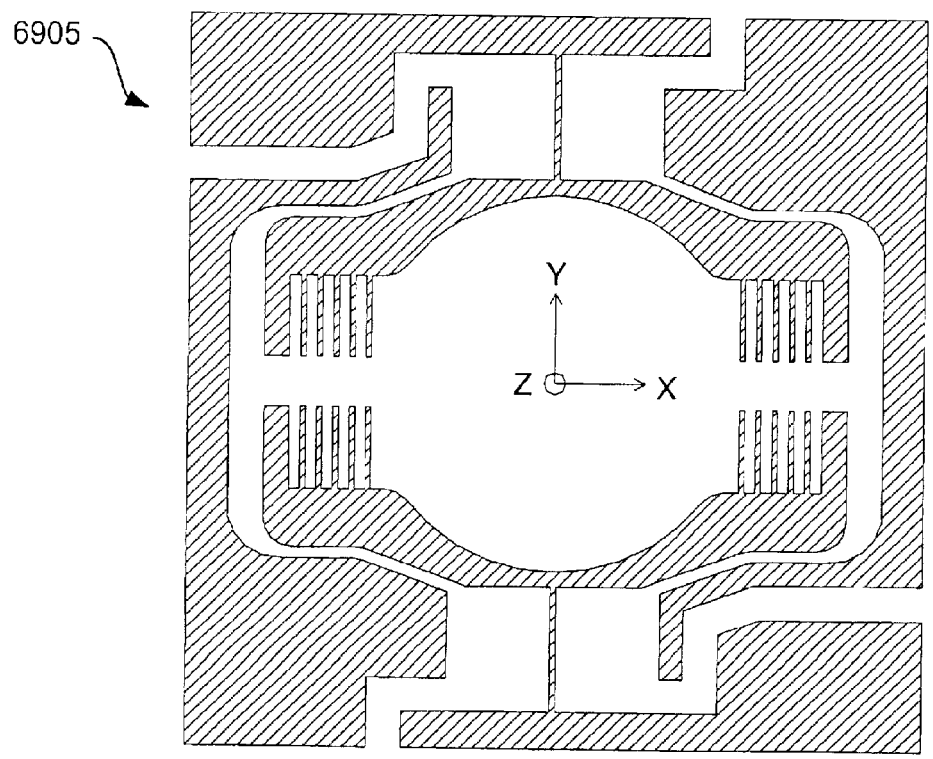

FIGS. 69A and 69B, respectively, are plan views of a top half 6900 and a bottom half 6905 of a multi-axis MEMS actuator in accordance with another embodiment of the invention. Top half 6900 includes a frame 6910 supporting an actuated member 6915. Frame 6910 includes a number of moveable combs 6920 interdigitated with a corresponding number of fixed combs 6925. The actuator of FIGS. 69A and 69B is similar to the actuator in FIGS. 1A and 1B, but affords the ability to translate member 6915 linearly along the X and Z axes (FIG. 69B) and rotationally around the X and Y axes. The actuator of FIGS. 69A and 69B can be fabricated using any of the process sequences described above.

Figure 70A:
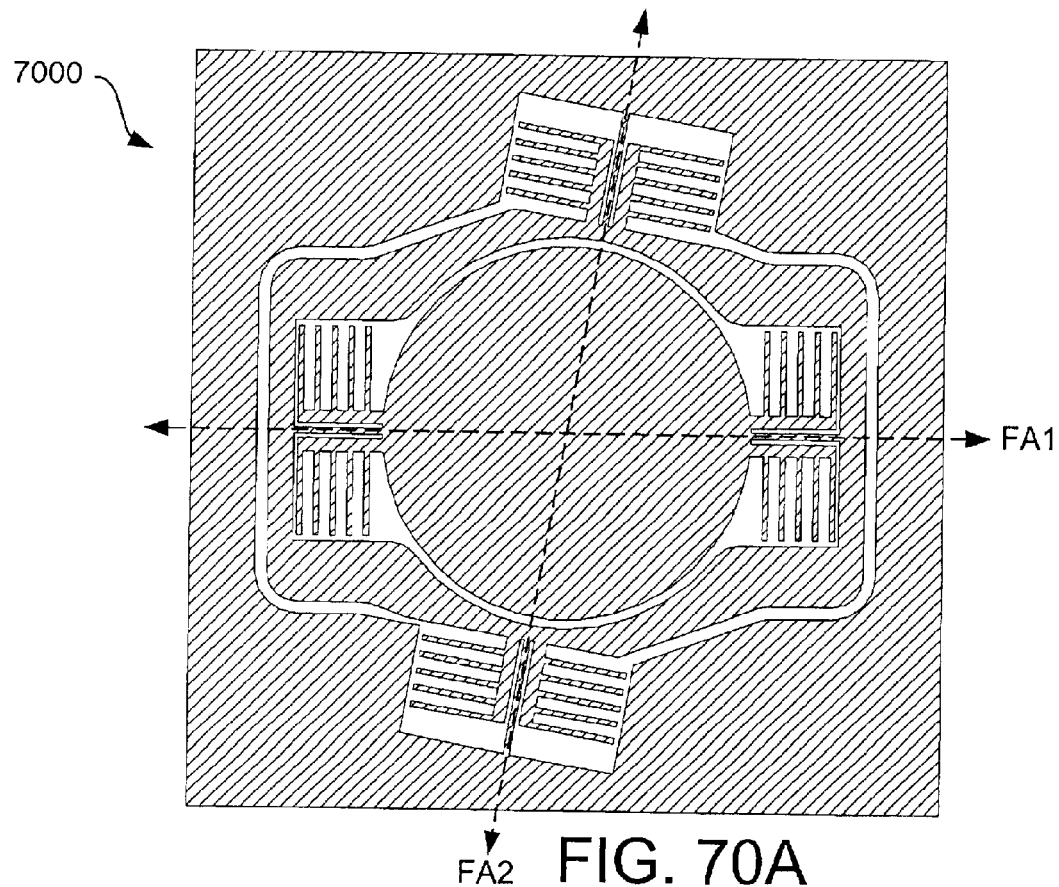
FIGS. 70A and 70B, respectively, are plan views of a top half 7000 and a bottom half 7005 of a multi-axis MEMS actuator in accordance with another embodiment of the invention.
Figure 70B:
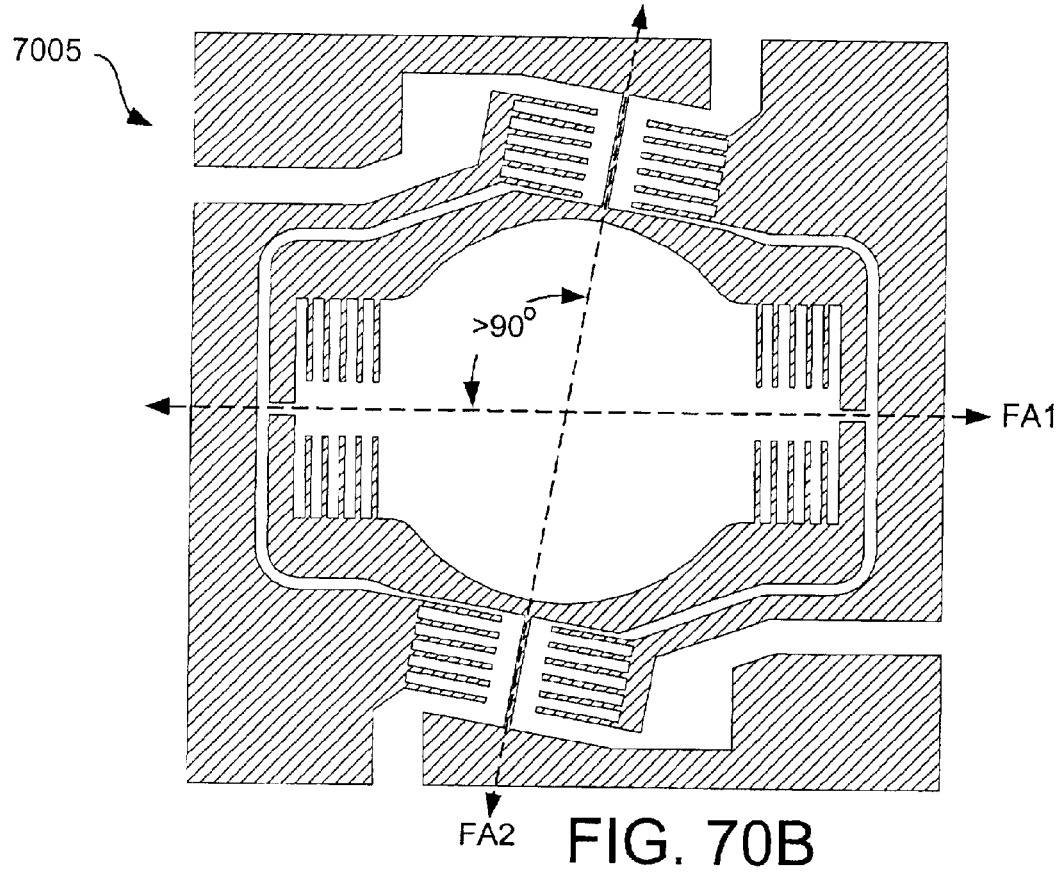

FIGS. 70A and 70B, respectively, are plan views of a top half 7000 and a bottom half 7005 of a multi-axis MEMS actuator in accordance with another embodiment of the invention. The actuator of FIGS. 70A and 70B is similar to the actuator of FIGS. 1A and 1B, but includes non-perpendicular fulcrum axes FA1 and FA2. The actuator of FIGS. 70A and 70B can be fabricated using any of the process sequences described above.

Figure 71A:
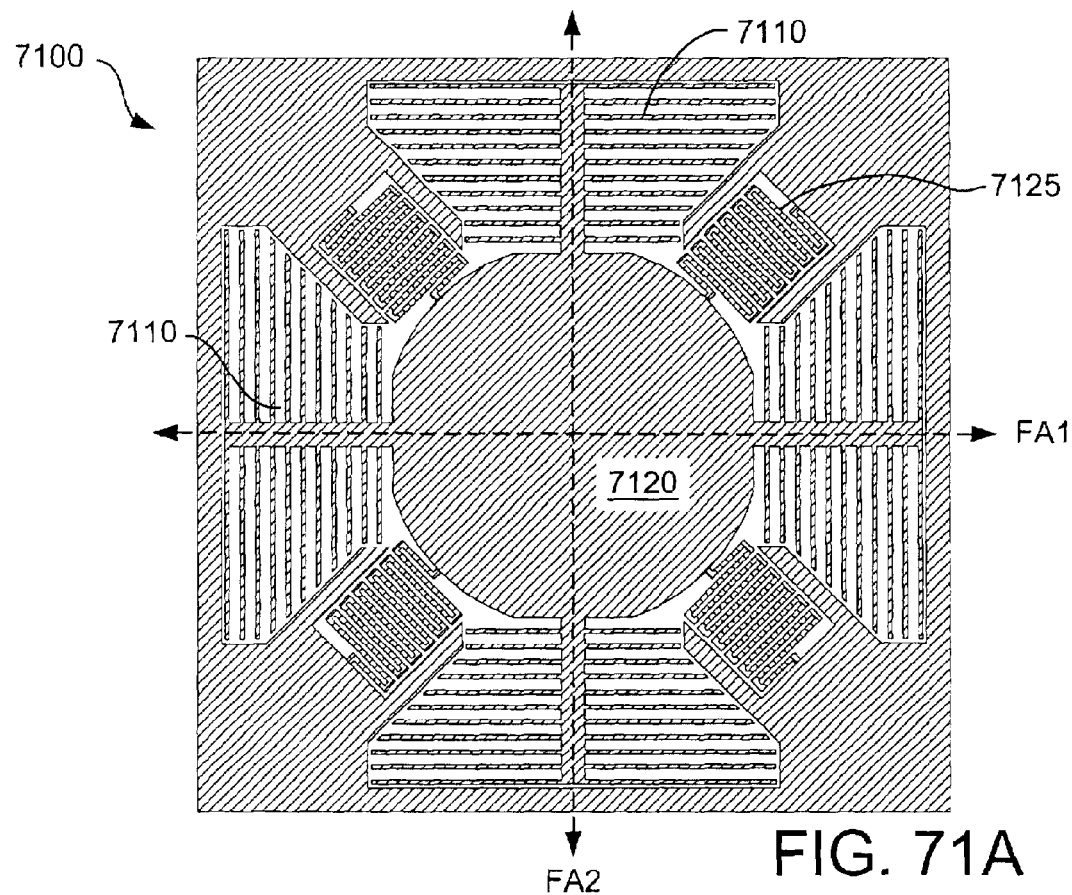
FIGS. 71A and 71B, respectively, are plan views of a top half 7100 and a bottom half 7105 of a multi-axis MEMS actuator in accordance with another embodiment of the invention.
Figure 71B:
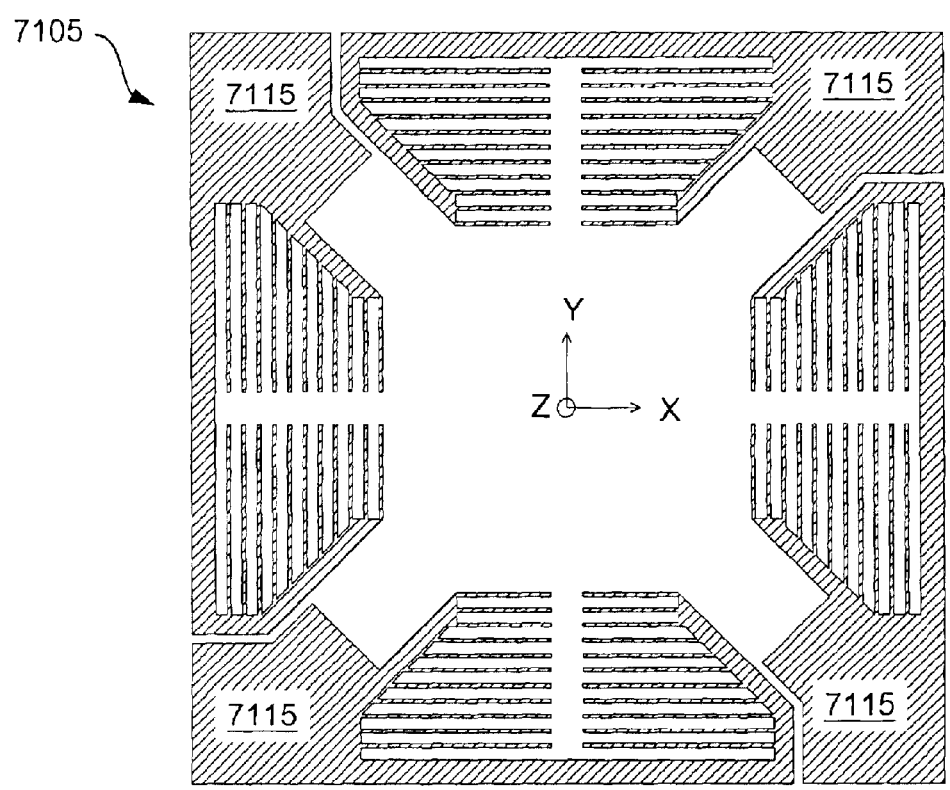

FIGS. 71A and 71B, respectively, are plan views of a too half 7100 and a bottom half 7105 of a multi-axis MEMS actuator in accordance with another embodiment of the invention. Top half 7100 includes four sets of combs 7110 interdigitated with four separate fixed combs 7115 on bottom half 7105. An actuated member 7120 suspended by four bending, serpentine hinges 7125 can pivot along either of two fulcrum axes FA1 and FA2, or can be moved vertically along the Z axis normal to the plane defined by the two fulcrum axes. Advantageously, the actuators described in connection with FIGS. 71A/B, can be fabricated using fewer process steps than other embodiments described herein. The simplified process sequence is similar to the process described in connection with FIGS. 2–32, but eliminates the need for the steps described in connection with FIGS. 8–10 and 14–17. Also advantageous, this embodiment eliminates the need to align two patterned wafers before bonding; instead, an unpatterned wafer is bonded to a patterned wafer. The structures disclosed below and described in connection with FIGS. 72A/B and 73A/B afford the same advantages.

Figure 72A:
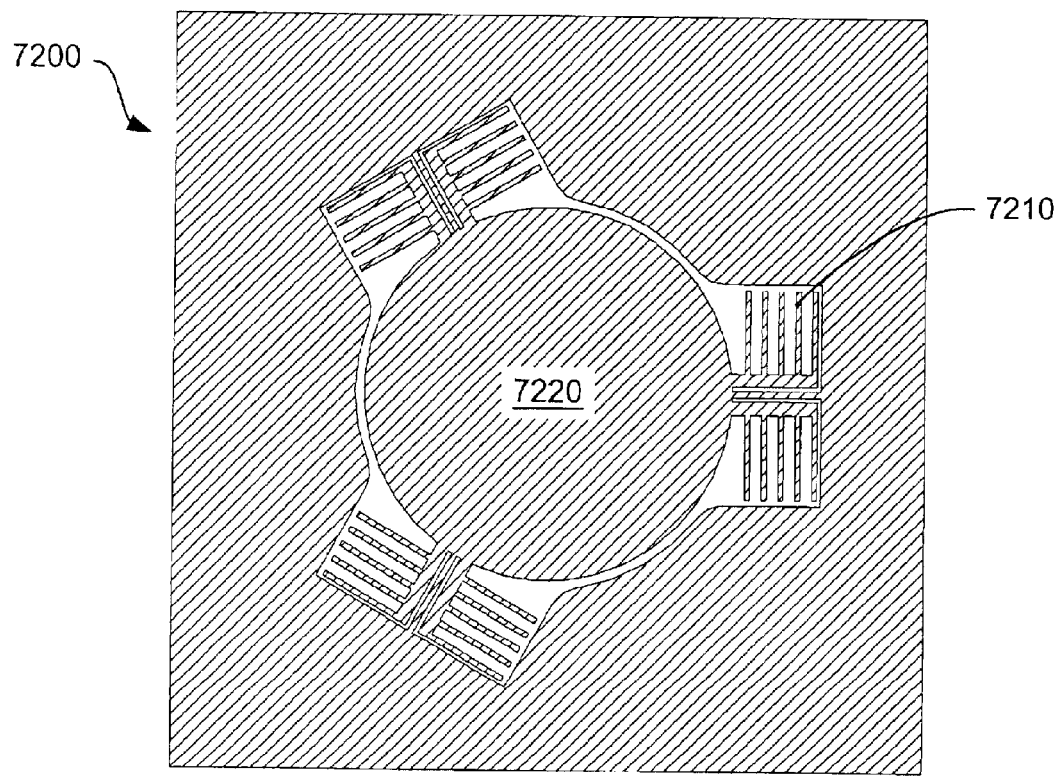
FIGS. 72A and 72B, respectively, are plan views of a top half 7200 and a bottom half 7205 of a multi-axis MEMS actuator in accordance with another embodiment of the invention.
Figure 72B:
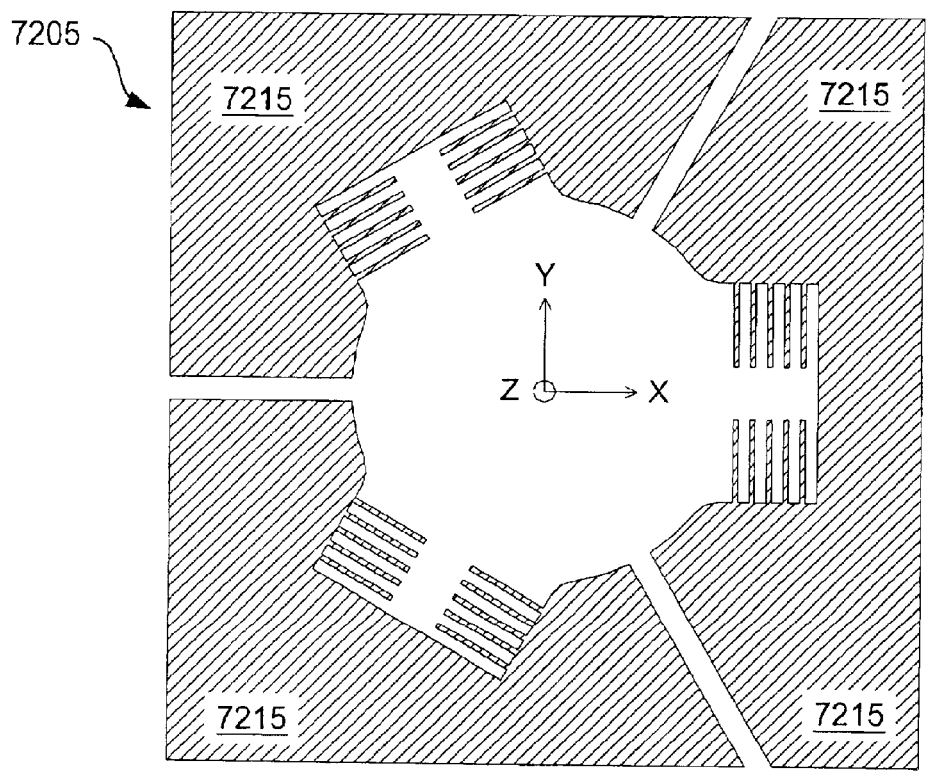

FIGS. 72A and 72B, respectively, are plan views of a top half 7200 and a bottom half 7205 of a multi-axis MEMS actuator in accordance with another embodiment of the invention. Top half 7200 includes three sets of combs 7210 interdigitated with three separate fixed combs 7215 on bottom half 7205. By supplying different voltages on selected ones of fixed combs 7215, an actuated member 7220 can be tilted in an X-Y plane and can be moved along a Z axis normal to the X-Y plane.

Figure 73A:
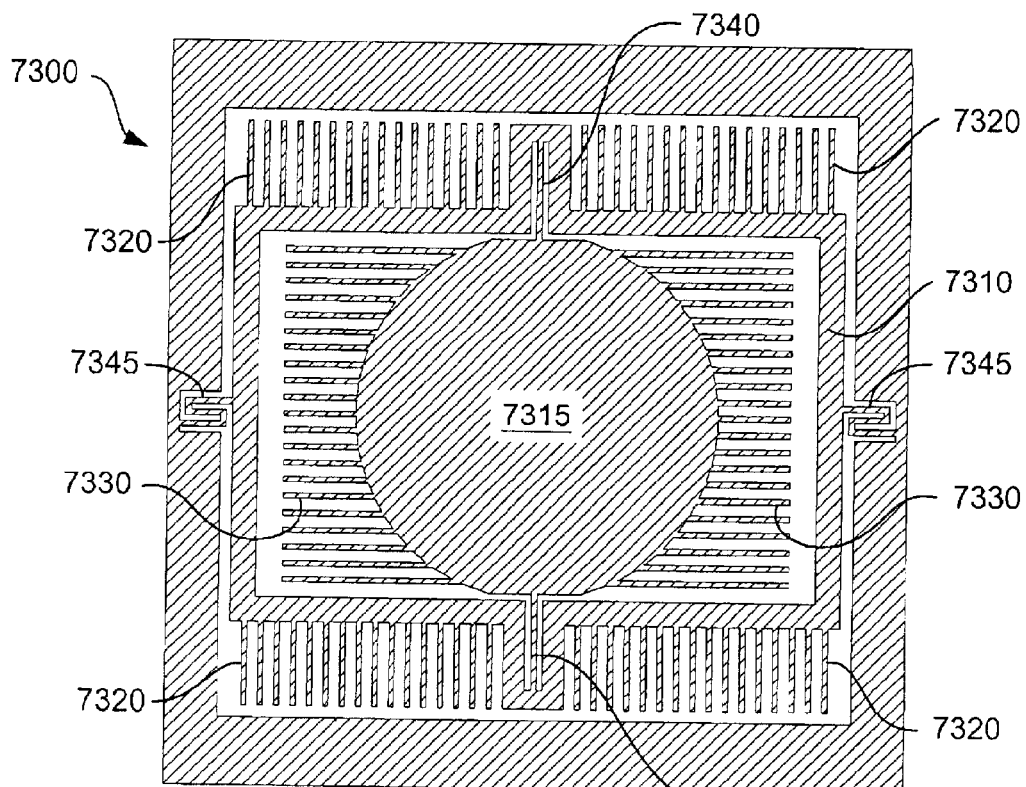
FIGS. 73A and 73B, respectively, are plan views of a top half 7300 and a bottom half 7305 of a multi-axis MEMS actuator in accordance with another embodiment of the invention.
Figure 73B:
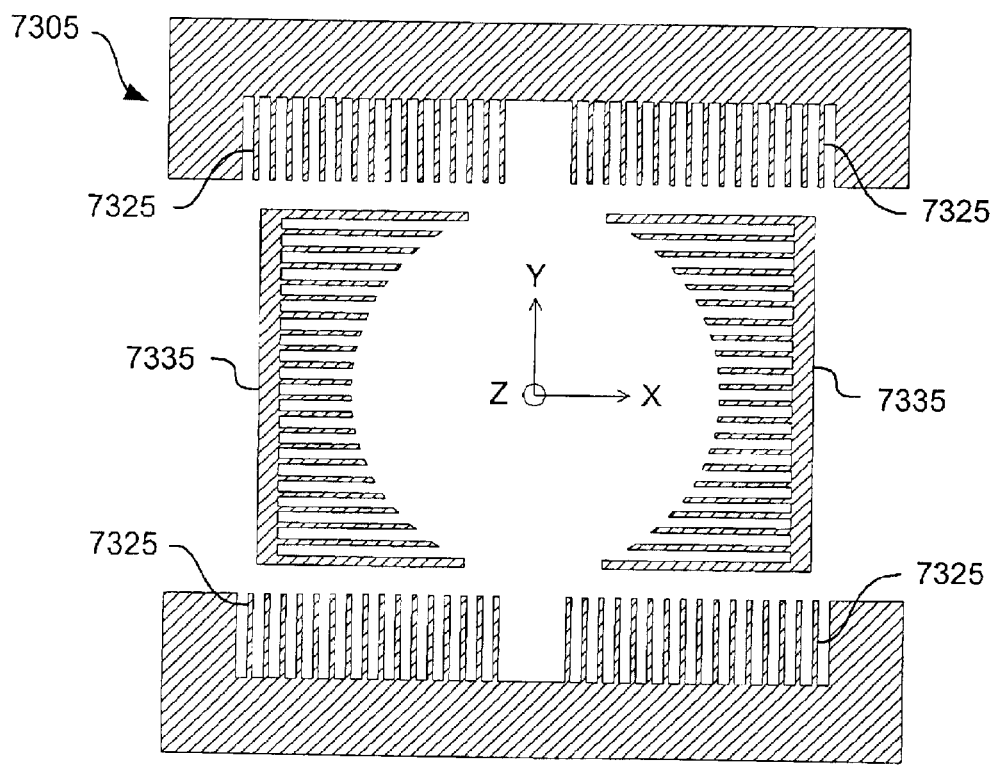

FIGS. 73A and 73B, respectively, are plan views of a top half 7300 and a bottom half 7305 of a multi-axis MEMS actuator in accordance with another embodiment of the invention. Top half 7300 includes a frame 7310 supporting an actuated member 7315. Frame 7310 includes a number of frame teeth 7320 interdigitated with corresponding fixed teeth 7325 on bottom half 7305; likewise, member 7315 includes a number of member teeth 7330 interdigitated with corresponding fixed teeth of combs 7335 on bottom half 7305. The actuator of FIGS. 73A and 73B is similar to the actuator in FIGS. 1A and 1B, and affords the ability to rotate member 7315 along a first rotational axis defined by torsional hinges 7340, a second rotational axis defined by torsional serpentine hinges 7345, and translationally along the Z axis normal to the two rotational axes.

The foregoing embodiments include springs that lie in substantially the same plane as the actuated member. It is also possible to attach an actuated member to a member support using one or more flexible elements extending from the bottom of the actuated member. In the case of a mirror, such a structure might be similar to a table on one or more flexible legs. The table surface (the mirror) would be movable in at least two dimensions. Such a structure could be fabricated using e.g. LIGA micromachining technology ("LIGA" is an acronym from German words for lithography, electroplating, and molding).

For additional information relating to MEMS actuators in general, and optical cross-connect switches in particular, see the following U.S. patent applications, each of which is incorporated by reference;

1. Ser. No. 09/880,456, entitled, "Optical Cross Connect Switching Array System With Electrical And Optical Position Sensitive Detection," by Vlad Novotny, filed Jun. 12, 2001; and
2. Ser. No. 09/981,628, entitled "Micro-Opto-Electro-Mechanical Switching System," by Vlad J. Novotny and Parvinder Dhillon, filed on Oct. 15, 2001.

While the present invention has been described in connection with specific embodiments, variations of these embodiments will be obvious to those of ordinary skill in the art. For example, each fulcrum axis may be provided along an edge of the actuated member and the number of combs may be different. Therefore, the spirit and scope of the appended claims should not be limited to the foregoing description.

What is claimed is:

1. A photolithographic process sequence for manufacturing MEMS structures from a first material layer of a first-material-layer thickness disposed over and in contact with a second material layer, the sequence comprising:
   a. forming a mask over the first material layer, wherein the mask leaves portions of the first material layer exposed;
   b. etching the first material layer in the exposed portions to a first depth less than the first-material-layer thickness, wherein the masked portions form a raised pattern defined by recessed areas formed in the exposed portions;
   c. removing at least a portion of the mask, leaving at least a portion of the raised pattern and the recessed areas exposed; and
   d. etching the exposed raised pattern and recessed areas of the first material layer until the second material layer is exposed in the recessed areas, leaving the pattern affixed to the second material layer.

2. The method of claim 1, wherein the pattern comprises first and second portions and wherein forming the mask comprises:
   a. forming a first sub-mask defining the first portion of the pattern; and
   e. forming a second sub-mask over the first sub-mask, the second sub-mask defining the second portion of the pattern.

3. The method of claim 2, wherein removing at least a portion of the mask comprises removing the second sub-mask.

4. The method of claim 3, wherein the second sub-mask comprises photoresist.

5. The method of claim 1, further adapted to manufacture a second collection of MEMS structures from a third material layer of a third-material-layer thickness, the sequence further comprising:
   a. forming a second mask over the third material layer, wherein the second mask leaves portions of the third material layer exposed;
   b. etching the third material layer in the exposed portions of the third material layer to a second depth less than the third-material-layer thickness, wherein the masked portions of the third material layer form a second raised pattern defined by recessed areas formed in the exposed portions of the third material layer;
   c. removing at least a portion of the second mask, leaving at least a portion of the second raised pattern and the recessed areas in the third material layer exposed; and
   d. etching the exposed second raised pattern and recessed areas in the third material layer to remove the material in the recessed areas of the third material layer.

6. The method of claim 5, wherein substantially all of the material in the recessed areas of the third material layer is removed.

7. The method of claim 5, wherein the second material layer is disposed between the first material layer and the third material layer.

8. A photolithographic method of patterning a first material layer over a second material layer, the first material layer being of a thickness and having a first surface in contact with the second material layer and a second surface, the method comprising:
   a. forming a mask over the second surface of the first material layer, wherein the mask leaves portions of the second surface exposed;

b. etching the first material layer in the exposed portions to a first depth less than the thickness of the first material layer, wherein the masked portions form a raised pattern defined by recessed areas formed in the exposed portions;

c. removing the mask, leaving the raised pattern and the recessed areas exposed; and d. etching the raised pattern and recessed areas of the first material layer until the second material layer is exposed in the recessed areas, leaving the pattern affixed to the second material layer.

9. The method of claim 8, wherein the first material layer comprises a semiconductor.

10. The method of claim 9, wherein the second material layer comprises an insulator.

11. The method of claim 8, wherein the first material later comprises a semiconductor, and wherein the second material layer comprises an insulator.

12. The method of claim 8, wherein the mask comprises a semiconductor.

13. The method of claim 8, wherein at least one of the etchings are accomplished using a reactive ion etch process.

14. A micro-machining method for patterning a first material layer over a second material layer, the first material layer being of a thickness and having a first surface in contact with the second material layer and a second surface, the method comprising:

a. forming a first mask over the second surface of the first material layer, wherein the first mask leaves portions of the second surface exposed;

b. etching the first material layer in the exposed portions to a first depth less than the thickness of the first material layer, wherein the masked portions form a raised pattern defined by recessed areas formed in the exposed portions;

c. forming a second mask over a first portion of the raised pattern, leaving a second portion of the raised pattern and the recessed areas exposed; and d. etching the second portion of the raised pattern and recessed areas of the first material layer until the second material layer is exposed in the recessed areas, leaving the pattern affixed to the second material layer, wherein the second mask protects the first portion of the raised pattern from the etching of (d), leaving the second portion of the raised pattern thinner than the first portion of the raised pattern.

15. The method of claim 14, wherein the second mask comprises at least a portion of the first mask.

16. The method of claim 14, wherein the first mask comprises photoresist.

17. The method of claim 14, wherein the first material layer comprises a semiconductor and the second material layer comprises an insulator.

18. The method of claim 14, further comprising removing at least a portion of the second material layer.

* * * * *